United States Patent
Katayama

(10) Patent No.: US 8,195,821 B2
(45) Date of Patent: Jun. 5, 2012

(54) AUTONOMOUS INFORMATION PROCESSING APPARATUS AND METHOD IN A NETWORK OF INFORMATION PROCESSING APPARATUSES

(75) Inventor: Yasushi Katayama, Tokyo (JP)

(73) Assignee: Sony Corporation, Tokyo (JP)

( * ) Notice: Subject to any disclaimer, the term of this patent is extended or adjusted under 35 U.S.C. 154(b) by 1628 days.

(21) Appl. No.: 10/501,082

(22) PCT Filed: Nov. 18, 2003

(86) PCT No.: PCT/JP03/14635
§ 371 (c)(1),
(2), (4) Date: Jul. 9, 2004

(87) PCT Pub. No.: WO2004/049178
PCT Pub. Date: Jun. 10, 2004

(65) Prior Publication Data
US 2005/0125549 A1    Jun. 9, 2005

(30) Foreign Application Priority Data
Nov. 26, 2002    (JP) .................... 2002-342440

(51) Int. Cl.
*G06F 15/16*    (2006.01)

(52) U.S. Cl. ........ 709/230; 709/229; 709/231; 709/232; 709/233

(58) Field of Classification Search ............. 709/230, 709/220, 217, 231, 232, 229, 233
See application file for complete search history.

(56) References Cited

U.S. PATENT DOCUMENTS

| | | | | |
|---|---|---|---|---|
| 5,699,369 A | * | 12/1997 | Guha | 714/774 |
| 5,841,598 A | * | 11/1998 | Horiuchi et al. | 360/31 |
| 6,085,019 A | * | 7/2000 | Ito et al. | 386/52 |
| 6,301,432 B2 | * | 10/2001 | Miyawaki et al. | 386/113 |
| 6,522,829 B1 | * | 2/2003 | Muramatsu et al. | 386/52 |

(Continued)

FOREIGN PATENT DOCUMENTS
JP    2001-045098    2/2001
(Continued)

OTHER PUBLICATIONS
Supplementary European Search Report dated Oct. 21, 2011.
(Continued)

*Primary Examiner* — Jeffrey Pwu
*Assistant Examiner* — Abdelnabi Musa
(74) *Attorney, Agent, or Firm* — Oblon, Spivak, McClelland, Maier & Neustadt, L.L.P.

(57) ABSTRACT

An apparatus and a method for implementing an execution configuration for efficiently recording and reproducing data using distributed nodes are provided. When data recording processing is performed for a plurality of distributed nodes connected to a network or when data recorded in the distributed nodes is collected and reproduced, a processing command apparatus sets data for determining for the nodes to determine whether to execute data recording or data reproducing and transmits a data processing request, in which the data for determination and data specifying data to be recorded or reproduced are stored, to the nodes so that the node side can autonomously determine whether to execute data processing based on the data for determination. This configuration eliminates the need for the command apparatus, which issues a processing request, to perform preprocessing such as the selection of a particular node, thus increasing the efficiency of data recording and reproducing processing for distributed nodes.

7 Claims, 20 Drawing Sheets

U.S. PATENT DOCUMENTS

| | | | |
|---|---|---|---|
| 6,567,176 B1 * | 5/2003 | Jeyachandran et al. | 358/1.14 |
| 6,990,453 B2 * | 1/2006 | Wang et al. | 704/270 |
| 7,016,598 B2 * | 3/2006 | Tabuchi et al. | 386/55 |
| 7,073,055 B1 * | 7/2006 | Freed et al. | 713/155 |
| 7,716,332 B1 * | 5/2010 | Topfl et al. | 709/226 |
| 2002/0069408 A1 * | 6/2002 | Abe et al. | 725/36 |
| 2003/0061165 A1 * | 3/2003 | Okamoto et al. | 705/52 |
| 2003/0179861 A1 * | 9/2003 | Miyoshi et al. | 379/68 |
| 2005/0198566 A1 * | 9/2005 | Takamine et al. | 715/513 |
| 2006/0095381 A1 * | 5/2006 | Yokota et al. | 705/57 |

FOREIGN PATENT DOCUMENTS

| | | |
|---|---|---|
| JP | 2001-51834 | 2/2001 |
| JP | 2001-051834 | 2/2001 |
| JP | 2001-251266 | 9/2001 |

OTHER PUBLICATIONS

Gupta et al, "Efficient Epidemic-Style Protocols for Reliable and Scalable Multicast," Proceedings 21$^{st}$ Symposium on Reliable Distributed Systems. SRDS-2002. Osaka University, Suita, Japan, Oct. 13-16, 2002; [Proceedings of the Symposium on Reliable Distributed Systems], Los Alamitos, CA: IEEE Comp. Soc., US, Oct. 13, 2002, pp. 180-189. XP010632028.

Ayalvadi J. Ganesh et al; "SCAMP: Peer-to-Peer Lightweight Membership Communication," Jan. 1, 2001, pp. 44-55. XP55008412.

\* cited by examiner

FIG. 10

| DATA ID | HASH VALUE OF DATA ID (MD5) | HASH VALUE OF DATA CONTENTS (MD5) |
|---|---|---|
| abc | 9001509 83cd24fb0d 6963f7d28e17f72 | c3fcd3d76192e4007df b496cca67e13b |

DATA CONTENTS: abcdefghijklmn opqrstuvwxyz

FIG. 12

| HEADER | DESCRIPTION OF REPRODUCING RULE DECIDING CONDITION | DESCRIPTION OF REQUEST | FOOTER |

AUTONOMOUS INFORMATION PROCESSING APPARATUS AND METHOD IN A NETWORK OF INFORMATION PROCESSING APPARATUSES

TECHNICAL FIELD

The present invention relates to an information processing apparatus and method, and a computer program. More particularly, the present invention relates to an information processing apparatus and method, and a computer program that make it possible to efficiently execute data processing, especially, data recording/reproducing processing, in which a plurality of networked information processing apparatuses are used.

BACKGROUND ART

Recently, a variety of information processing apparatuses, for example, personal computers (PC), large computers, servers, and other communication apparatuses, are connected to a communication network such as the Internet to transfer contents such video, image data, audio data, or various programs or to transfer various types of processing data among networked apparatuses. The types of contents transferred via a network have changed from text and still images to multimedia contents, such as moving image and audio, and the content sizes are getting significantly larger.

A large storage system is attracting attention in which data is distributed among many information processing terminals that are interconnected via a network for recording data thereon. In such a distributed storage system, a server responsible for recording and managing data transmits data to information processing terminals and other servers in multicast mode to record the data on local recording media provided on the information processing terminals and other servers.

In this case, a large amount of data must be recorded on a recording medium to allow data to be retrieved on an on-demand basis. For example, when a movie requires about 2 G bytes of data per one program, recording 500 programs of such video data requires a capacity of one terabyte or more.

In an example for providing data by streaming, when a server provides data by unicast to a client which requires data, in order to realize error-free transmission, a protocol that requires the retransmission of data such as an acknowledgement signal (ACK) of TCP/IP is used.

However, this method places a heavy load on the server and, therefore, even if one high performance server available today is used, it could serve only several hundreds of clients. Even when a protocol, such as UDP/IP, that does not use ACK is employed, only several thousands of clients can be served. Thus, an attempt to provide data by streaming increases the cost of the server side and limits the number of clients.

In recent years, a method that combines the multicast technology with FEC (Forward Error Correction) is proposed for transmitting data to a plurality of clients without requesting the retransmission of data. In this method, a server transmits a stream repeatedly in multicast mode, and a client selectively receives necessary signals from this stream, and decodes the selectively received data for reproducing.

Transmitting 500 programs of movie video data, each of which is 2 G bytes per program, within 10 minutes using this method requires the transmission band of about 14.7 G bits/second. In addition, transmitting the same amount of video data within one minute requires the transmission band of about 147 G bits/second. This is a theoretical value, and a server that satisfies this transmission amount and transmission method would be very costly and, even if implemented, it is impractical. Another method is to distribute data for recording among a plurality of hosts, but an attempt to implement this system would require a plurality of servers to manage a huge amount of data and therefore result in an increased amount of processing for data management or data communication.

Recently, a peer-to-peer (P2P: Peer-to-Peer) network technology is developed and used for direct communication processing between information processing apparatuses. This P2P network refers to a configuration in which, instead of installing a server that centrally performs processing, the information processing apparatuses that are resources of network clients, including various apparatuses such as a PC, a portable terminal, a PDA, a cellular phone, and, in addition, a disk that is storage means having a communication function or connected to a communication apparatus, or a printer, communicate with each other via a network to allow the resources of the network clients to be shared.

The peer-to-peer (P2P: Peer-to-Peer) network technology was first used in APPN (Advanced Peer to Peer Networking) proposed by IBM in US. Using this network eliminates the need for a huge delivery server to be installed for delivering contents in a conventional client-server network, allows many users to use contents distributed among the resources of the network clients, and allows a large amount of contents to be stored in distributed locations and to be delivered.

There are two peer-to-peer (P2P: Peer-to-Peer) network modes: "pure peer-to-peer (P2P: Peer-to-Peer) network" and "hybrid peer-to-peer (P2P: Peer-to-Peer) network".

The pure peer-to-peer (P2P: Peer-to-Peer) network refers to a network mode in which the system components (peer) each have an equal function and role, and perform equal communication. A typical service using this network mode is Gnuterlla. The hybrid peer-to-peer (P2P: Peer-to-Peer) network refers to a network mode in which a control server is used for smoothing interoperation between the system components (peer) in addition to the pure peer-to-peer (P2P: Peer-to-Peer) network. A typical service using this network mode is Napster.

When a terminal connected to a network tries to obtain contents in the hybrid peer-to-peer (Hybrid P2P) method as typified by Napster, the central server first searches the contents resources, and based on the search information, the terminal accesses a node (another terminal connected to the network) having the resources, and obtains the contents. A disadvantage of this method is that resource information on all nodes must be registered with the central server and that the central server must centrally search for information.

To solve this problem, a method is proposed for distributing and executing processing such as resource search processing and the like among a plurality of apparatuses. In this processing distribution method, processing execution determination devices are managed, for example, by arranging them in a tree-like relation, and processing such as resource search is distributed and executed among a plurality of apparatuses based on the management information. However, as the number of apparatuses that execute processing increases, for example, to several millions, this method also has problems that the amount of information for managing the tree structure increases, that the number of processing commands for transmitting execution commands to the plurality of processing apparatuses increases, and that tree consistency must be guaranteed. This method also has a problem that a processing delay is caused because the plurality of processing execution determination apparatuses must perform determination processing.

To overcome those disadvantages, there is another method in which all commands are transmitted to all nodes connected to a network to allow the nodes to determine whether they will execute the received processing commands. This is the pure peer-to-peer (Pure P2P) method as represented by Gnutella. Unlike the hybrid peer-to-peer (Hybrid P2P) method, this method uses a configuration in which there is no central server that executes resource search processing and in which a search request is transferred directly among nodes to make a search for resources, and a processing request such as a content transmission request is issued to a terminal that is hit.

Even in this pure peer-to-peer (pure P2P) method as typified by Gnutella, an efficient configuration is the one in which a search is made through all nodes or as many nodes as possible by using the routing of a tree structure or a network structure when a search command is transmitted. However, this method also has a disadvantage in that a load is placed on the transmission path because the method requires a node to perform command transfer processing for a processing command that will not be executed in that node.

For example, to search for all network connection nodes to allow a processing request to arrive at all nodes, complex routing management is necessary. On the other hand, a node search in best-effort mode, if executed, does not guarantee that a command is transmitted to all nodes and sometimes fails to find required resources. Another problem is that frequent communication for searching for nodes generates network congestion.

DISCLOSURE OF THE INVENTION

In view of the problems described above, it is an object of the present invention to provide an information processing apparatus and method, and a computer program for efficiently executing data processing while preventing an increase in the network traffic caused by the transfer of many packets, in which in a network configuration where a plurality of terminals (nodes) are connected, for example, when data processing such as content recording processing or content reproducing processing is executed using storage means provided in the plurality of terminals (nodes) connected to the network, a content recording request or reproducing request is transmitted based on a predetermined rule without performing preprocessing such as node search processing, and the terminals (nodes) that receive this request autonomously determine whether to execute a command and selectively execute the command.

According to a first aspect of the present invention, an information processing apparatus as a recording command apparatus for transmitting a data recording processing request to nodes connected to a network is characterized by comprising:

a rule deciding condition setting unit for setting data for determining whether processing according to the processing request is to be executed in a node that receives the data recording processing request;

a packet generating unit for storing data for determination set by the rule deciding condition setting unit, and for generating a data recording processing request packet that stores data for recording processing; and a network interface unit for transmitting the packets generated by the packet generating unit.

One embodiment of the information processing apparatus according to the present invention is characterized in that the rule deciding condition setting unit is configured to execute setting processing for a probability value: $\alpha$ as a description of recording rule deciding condition for use in determining whether the processing according to the processing request is to be executed in a node that receives the data recording processing request, and the packet generating unit is configured to execute generation processing for packets that store the probability value: $\alpha$ as the description of recording rule deciding condition.

One embodiment of the information processing apparatus according to the present invention is characterized by further comprising a data processing unit for executing FEC encoding processing and interleave processing for data for recording processing, and the packet generating unit is configured to execute generation processing of a packet in which data processed by the data processing unit is set as a payload.

One embodiment of the information processing apparatus according to the present invention is characterized by further comprising a data processing unit for executing FEC encoding processing for data for recording processing, wherein the data processing unit is configured to divide the data into p blocks and to execute encoding processing of encoding rate of q/p for converting into q blocks by applying FEC encoding to thus generated p blocks, and the rule deciding condition setting unit is configured to set a probability value: $\alpha$ which causes to recording data with a recording probability: $\alpha$ as a description of recording rule deciding condition in a node that receives the data recording processing request, and is configured to set the probability value: $\alpha$ so that a relation between the number of return blocks: $q \times \alpha \times n \times \beta$ which is able to be calculated from a return probability: $\beta$ specified by a reproducing command apparatus connected to the network, the number of the encoded blocks: q, and the number of network connection nodes: n, and the number of blocks: p becomes the number of return blocks: $q \times \alpha \times n \times \beta$ > the number of blocks: p.

According to a second aspect of the present invention, an information processing apparatus as a reproducing command apparatus for transmitting a data reproducing processing request to nodes connected to a network is characterized by comprising:

a rule deciding condition setting unit for setting data for determining whether processing according to the processing request is to be executed in a node that receives the data reproducing processing request;

a packet generating unit for storing data for determination set by the rule deciding condition setting unit, and for generating a data reproducing processing request packet that stores data for reproducing processing; and a network interface unit for transmitting the packets generated by the packet generating unit.

One embodiment of the information processing apparatus according to the present invention is characterized in that the rule deciding condition setting unit is configured to execute setting processing for a probability value: $\alpha$ as a description of reproducing rule deciding condition for use in determining whether the processing according to the processing request is to be executed in a node that receives the data reproducing processing request, and the packet generating unit is configured to execute generation processing for packets that store the probability value: $\alpha$ as the description of reproducing rule deciding condition.

One embodiment of the information processing apparatus according to the present invention is characterized by further comprising a data recovery processing unit for executing de-interleave processing and FEC decoding processing, and the data recovery processing unit executes the de-interleave processing and the FEC decoding processing for data for reproducing processing extracted from a packet received from a node that receives the data reproducing processing request, and recovers the data.

One embodiment of the information processing apparatus according to the present invention is characterized in that the data for reproducing processing stored in the node is the data divided into p blocks executed encoding processing of encoding rate of q/p for converting into q blocks by applying FEC encoding to thus generated p blocks, and the rule deciding condition setting unit is configured to set a probability value: $\beta$ which causes to return data with a return probability: $\beta$ as a description of reproducing rule deciding condition in a node that receives the data reproducing processing request, and is configured to set the probability value: $\beta$ so that a relation between the number of return blocks: $q \times \alpha \times n \times \beta$ which is able to be calculated from a recording probability: $\alpha$ specified by a recording command apparatus connected to the network, the number of the encoded blocks: q, and the number of network connection nodes: n, and the number of blocks: p becomes the number of return blocks: $q \times \alpha \times n \times \beta >$ the number of blocks: p.

According to a third aspect of the present invention, an information processing apparatus is characterized by comprising:

a data reception unit;

a rule decision processing unit for determining whether data processing based on a data processing request received via the data reception unit is to be executed; and a data processing unit for executing data processing based on the determination of the rule decision processing unit, wherein;

the rule decision processing unit is configured to execute determination processing for determining whether or not the processing according to the processing request is to be executed based on data for determination included in the data processing request received via the data reception unit.

One embodiment of the information processing apparatus according to the present invention is characterized in that the data for determination is a probability value as a rule deciding condition descriptor included in a data processing request, and the rule decision processing unit is configured to determine whether or not the processing according to a processing request is to be executed in accordance with the probability value.

One embodiment of the information processing apparatus according to the present invention is characterized in that the data for determination is a probability value as a rule deciding condition descriptor included in a data processing request, and the rule decision processing unit is configured to execute random number generation processing, and to execute determining processing for determining whether or not the processing according to a processing request is to be executed according to a result of comparison between a generated random number and the probability value.

One embodiment of the information processing apparatus according to the present invention is characterized in that the data for determination is data processing request storing data included in a data processing request, and the rule decision processing unit is configured to perform hash value calculation processing based on the data processing request storing data, and to execute determining processing for determining whether or not the processing according to a processing request is to be executed according to a result of comparison between a calculated hash value and a setting value set in its own apparatus in advance.

According to a fourth aspect of the present invention, a data recording processing method for transmitting a data recording processing request to a plurality of nodes connected to a network, and for executing distributed data recording processing for the plurality of nodes is characterized by comprising:

a rule deciding condition setting step for setting data for determining whether the processing according to the processing request is to be executed in a node that receives the data recording processing request;

a packet generating step storing data for determination set by the rule deciding condition setting step, and for generating a data recording processing request packet that stores the data for recording processing; and a packet transmitting step for transmitting the packets generated by the packet generating step.

One embodiment of the data recording processing method according to the present invention is characterized in that the rule deciding condition setting step executes setting processing for a probability value: $\alpha$ as a description of recording rule deciding condition for use in determining whether the processing according to the processing request is to be executed in a node that receives the data recording processing request, and the packet generating step executes generation processing for packets that store the probability value: $\alpha$ as the description of recording rule deciding condition.

One embodiment of the data recording processing method according to the present invention is characterized in that the data recording processing method further comprises a data processing unit for executing FEC encoding processing and interleave processing for data for recording processing, and the packet generating step executes generation processing of a packet in which data processed by the data processing step is set as a payload.

One embodiment of the data recording processing method according to the present invention is characterized in that the data recording processing method further comprises a data processing step for executing FEC encoding processing for data for recording processing, the data processing step divides the data into p blocks and executes encoding processing of encoding rate of q/p for converting into q blocks by applying FEC encoding to thus generated p blocks, and the rule deciding condition setting unit sets a probability value: $\alpha$ which causes to record data with a recording probability: $\alpha$ as a description of recording rule deciding condition in a node that receives the data recording processing request, and sets the probability value: $\alpha$ so that a relation between the number of return blocks: $q \times \alpha \times n \times \beta$ which is able to be calculated from a return probability: $\beta$ specified by a reproducing command apparatus connected to the network, the number of the encoded blocks: q, and the number of network connection nodes: n, and the number of blocks: p becomes the number of return blocks: $q \times \alpha \times n \times \beta >$ the number of blocks: p.

According to a fifth aspect of the present invention, a data reproducing processing method for transmitting a data reproducing processing request to nodes connected to a network, and for executing data reproducing processing based on return data is characterized by comprising:

a rule deciding condition setting step for setting data for determining whether the processing according to the processing request is to be executed in a node that receives the data reproducing processing request;

a packet generating step for storing the data for determination set by the rule deciding condition setting step, and for generating a data reproducing processing request packet that stores specifying data of the data for reproducing processing; and a packet transmitting step for transmitting the packets generated by the packet generating step.

One embodiment of the data reproducing processing method according to the present invention is characterized in that the rule deciding condition setting step executes setting processing for a probability value: β as a description of reproducing rule deciding condition for use in determining whether the processing according to the processing request is to be executed in a node that receives the data reproducing processing request, and the packet generating step executes generation processing for packets that store the probability value: β as the description of reproducing rule deciding condition.

One embodiment of the data reproducing processing method according to the present invention is characterized in that the data reproducing processing method further comprises a data recovery processing step for executing de-interleave processing and FEC decoding processing, and the data recovery processing step executes the de-interleave processing and the FEC decoding processing for data for reproducing processing extracted from a packet received from a node that receives the data reproducing processing request, and recovers the data.

One embodiment of the data reproducing processing method according to the present invention is characterized in that the data for reproducing processing stored in the node is the data divided into p blocks executed encoding processing of encoding rate of q/p for converting into q blocks by applying FEC encoding to thus generated p blocks, and the rule deciding condition setting step sets a probability value: β which causes to return data with a return probability: β as a description of reproducing rule deciding condition in a node that receives the data reproducing processing request, and sets the probability value: β so that a relation between the number of return blocks: q×α×n×β which is able to be calculated from a recording probability: α specified by a recording command apparatus connected to the network, the number of the encoded blocks: q, and the number of network connection nodes: n, and the number of blocks: p becomes the number of return blocks: q×α×n×β>the number of blocks: p.

According to a sixth aspect of the present invention, a data processing method for analyzing a data processing request received via a data reception unit, and for determining whether the data processing request is to be executed is characterized by comprising:

a rule decision processing step for determining whether data processing based on the data processing request is to be executed; and a data processing step for executing data processing based on the determination of the rule decision processing step, wherein;

the rule decision processing step determines whether or not the processing according to the processing request is to be executed based on data for determination included in the data processing request received via the data reception unit.

One embodiment of the data processing method according to the present invention is characterized in that the data for determination is a probability value that is a rule deciding condition descriptor included in the data processing request, and the rule decision processing step determines whether or not the processing according to the processing request is to be executed in accordance with the probability value.

One embodiment of the data processing method according to the present invention is characterized in that the data for determination is a probability value that is a rule deciding condition descriptor included in the data processing request, and the rule decision processing step executes random number generation processing, and determines whether or not the processing according to the processing request is to be executed according to a result of comparison between a generated random number and the probability value.

One embodiment of the data processing method according to the present invention is characterized in that the data for determination is data processing request storing data included in the data processing request, and the rule decision processing step executes hash value calculation processing based on the data processing request storing data, and determines whether or not processing according to the processing request is to be executed according to a result of comparison between a calculated hash value and a setting value set in its own apparatus in advance.

According to a seventh aspect of the present invention, a computer program for transmitting a data recording processing request to a plurality of nodes connected to a network and for executing distributed data recording processing for the plurality of nodes is characterized by comprising:

a rule deciding condition setting step for setting data for determining whether the processing according to the processing request is to be executed in a node that receives the data recording processing request;

a packet generating step for storing the data for determination set by the rule deciding condition setting step, and for generating a data recording processing request packet that stores the data for recording processing; and a packet transmitting step for transmitting the packets generated by the packet generating step.

According to an eighth aspect of the present invention, a computer program for transmitting a data reproducing processing request to nodes connected to a network and for executing data reproducing processing based on return data is characterized by comprising:

a rule deciding condition setting step for setting data for determining whether the processing according to the processing request is to be executed in a node that receives the data recording processing request;

a packet generating step for storing the data for determination set by the rule deciding condition setting step, and for generating a data reproducing processing request packet that stores specifying data for data for reproducing processing; and a packet transmitting step for transmitting the packets generated by the packet generating step.

According to a ninth aspect of the present invention, a computer program for analyzing a data processing request received via a data reception unit, and for determining whether the data processing request is to be executed is characterized by comprising:

a rule decision processing step for determining whether the data processing based on the data processing request is to be executed; and a data processing step for executing the data processing based on the determination of the rule decision processing step, wherein;

the rule decision processing step determines whether or not the processing according to the processing request is to be executed based on data for determination included in the data processing request received via the data reception unit.

When data recording processing is performed for a plurality of distributed nodes connected to a network, a recording command apparatus sets data for determining for the nodes to determine whether to execute data recording and transmits a data recording processing request, in which the data for determination and data to be recorded are stored, to the nodes so that the nodes can autonomously determine whether to execute data recording processing based on the data for determination. Therefore, the configuration of the present invention eliminates the need for the recording command apparatus, which issues a recording request, to perform preprocessing such as the selection of a particular recording node, thus increasing the efficiency of data recording processing for distributed nodes.

Furthermore, when data recorded in the distributed nodes connected to a network is collected and reproduced, a reproducing command apparatus that transmits a data reproducing processing request sets data for determining for the nodes to determine whether to extract and transmit data and transmits a data reproducing processing request, in which the data for determination that is set and data specifying data to be reproduced are stored, to the nodes so that the nodes can autonomously determine whether to extract and transmit data based on the data for determination. Therefore, the configuration according to the present invention eliminates the need for the reproducing command apparatus to perform preprocessing such as the selection of a particular recording node, thus increasing the efficiency of data reproducing processing for distributed nodes.

Furthermore, the configuration according to the present invention eliminates the need for the processing requesting side to search for a node (information processing apparatus) to be processed, because an information processing apparatus connected to the network determines whether to execute processing requested by the processing request based on the data for determination included in the data processing request received via the data reception unit.

Furthermore, the configuration according to the present invention ensures the reliable recovery of data from the return data, because data distributed and recorded to the nodes is divided into p blocks, FEC encoding with the encoding rate of q/p is performed for the p blocks to convert them into q blocks, and the recording probability: $\alpha$ of each node and the return probability: $\beta$ specified by the reproducing command apparatus are set such that the number of return blocks: $q \times \alpha \times n \times \beta >$ the number of blocks: p.

A computer program according to the present invention is a computer program that can be provided to a general-purpose computer system, capable of executing various program code, via a computer-readable storage medium or communication medium, for example, a recording medium such as a CD, an FD, and an MO or a communication medium such as a network. Providing such a program in a computer-readable form allows processing to be executed in the computer system according to the program.

Other objects, features, and advantages of the present invention will be made more apparent by the detailed description of the embodiment and the accompanying drawings that will be described in detail later. It should be noted that the system in this specification refers to the configuration of a logical collection of multiple apparatuses but is not limited to the configuration in which the apparatuses, each with its own configuration, are in the same cabinet.

DESCRIPTION OF THE DRAWINGS

FIG. 10 is a diagram showing an example of a hash value generated during autonomous processing execution determination in a node that receives a data recording processing request packet from the recording command apparatus.

FIG. 12 is a diagram showing the configuration of a data reproducing processing request packet transmitted from the reproducing command apparatus.

BEST MODE FOR CARRYING OUT THE INVENTION

An information processing apparatus and method and a computer program according to the present invention will be described in detail below with reference to the drawings. The following items are described in the order shown below.

1. Network configuration.
2. Configuration of information processing apparatus as a node.
3. Configuration of recording command apparatus and data recording processing.
4. Configuration of reproducing command apparatus and data reproducing processing.
5. Data recording/reproducing processing sequence.
6. Hardware configuration of information processing apparatus.

[1. Network Configuration]

Figure 1:
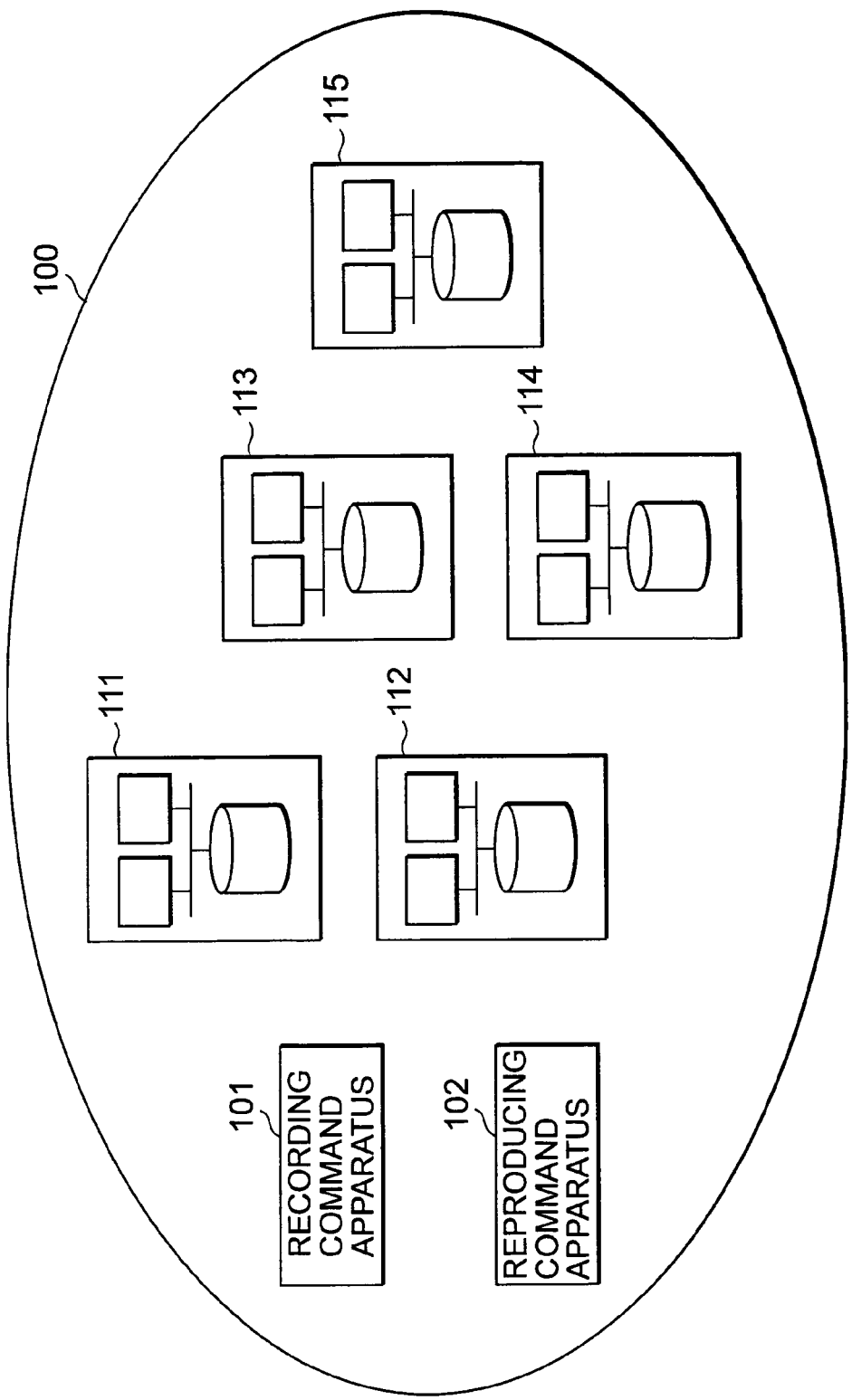
FIG. 1 is a diagram showing an example of the configuration of a distributed storage system to which the present invention is applicable.

First, an example of the network configuration for executing data processing, to which an information processing apparatus according to the present invention is applied, will be described with reference to FIG. 1. FIG. 1 is a diagram showing a specific example of a distributed storage system in which data is distributed for recording among the terminals of the network. The distributed storage system comprises n nodes 111, 112, . . . , 115 connected to the communication network of a network 100, a recording command apparatus 101 that instructs and controls the recording of data on the nodes, and a reproducing command apparatus 102 that reproduces data recorded in the nodes.

Although the recording command apparatus 101, nodes 111 to 115, and reproducing command apparatus 102 are described as separate apparatuses in this embodiment, an apparatus such as a reproducing/recording command apparatus having the functions of both apparatuses may also be used. Each of the nodes may also be able to have the functions of the recording command apparatus and the reproducing command apparatus. In this case, the apparatuses configuring the network may be used equivalently. The recording command apparatus, the reproducing command apparatus, and nodes are generically called as information processing apparatuses.

Figure 2:
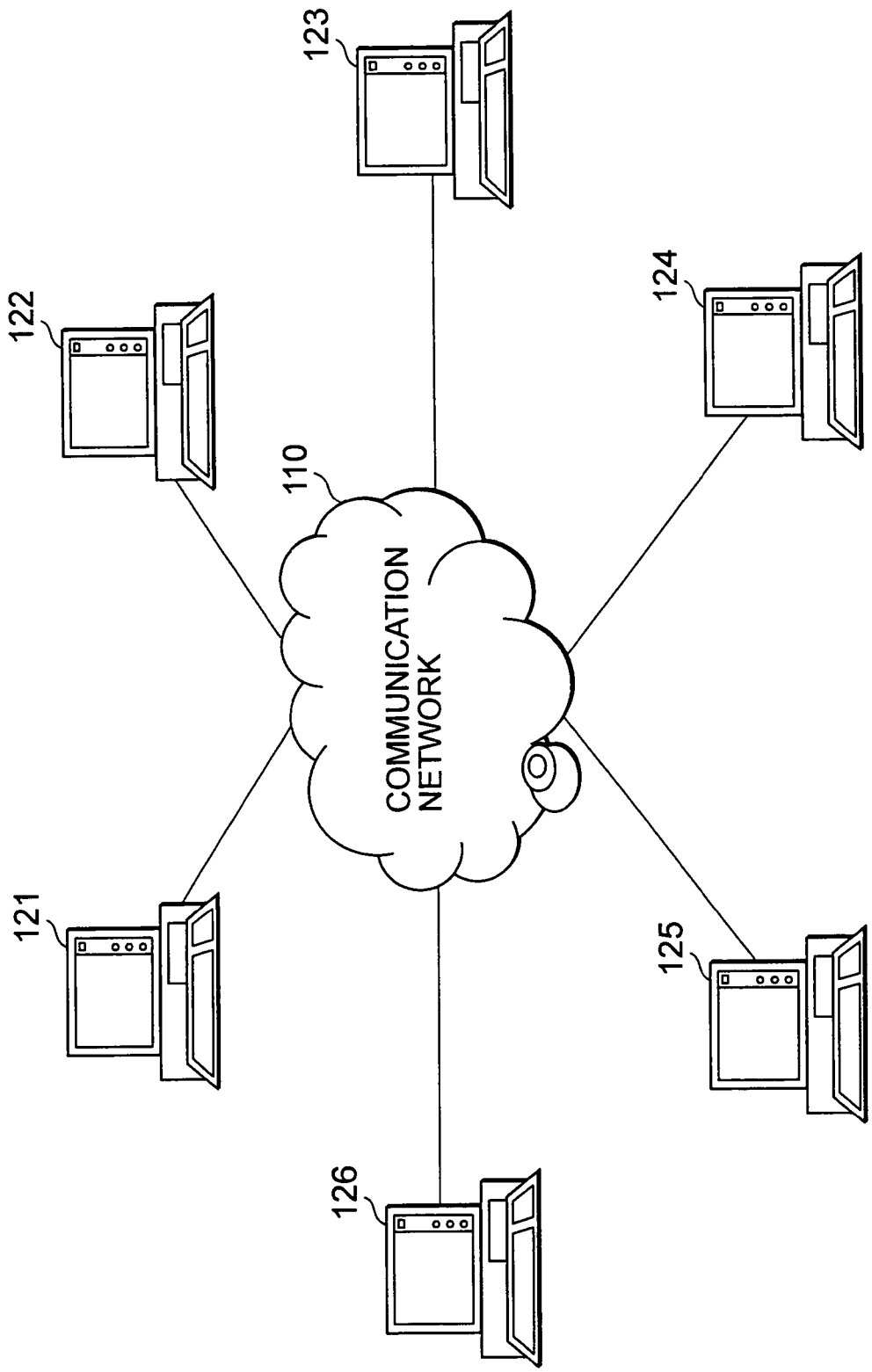
FIG. 2 is a diagram showing an example of a network configuration to which the present invention is applicable.

That is, the network configuration such as the one shown in FIG. 2 can be assumed. The information processing apparatuses, each having a configuration to be able to communicate with other information processing apparatuses, are connected via a communication network. Basically, the network is a pure peer-to-peer (P2P) network with no control server that works as a Look-up Server.

As shown in FIG. 2, information processing apparatuses 121 to 126 communicate with each other via a network 110 to perform data processing such as content recording processing and content reproducing processing. The present invention is also applicable to a hybrid peer-to-peer (P2P) network having a control server, and is not applicable only to limited network configurations but applicable to any configuration in which information processing apparatuses is able to communicate with each other.

One of the information processing apparatuses 121 to 126 shown in FIG. 2 outputs a content recording request or a content reproducing request to the information processing apparatuses connected to the network. When carrying out a content recording request, the information processing apparatus generates recording request processing request packets in which a multicast address generated based on a predetermined rule is set, performs FEC (Forward Error Correction) for the contents and stores them in the packets as interleaved divided data, and transmits those packets to other information processing apparatuses. An information processing apparatus that receives those packets autonomously determines if it executes data recording processing based on the determination, and performs content recording processing.

When performing content reproducing processing, one of the information processing apparatuses 121 to 126 generates a content reproducing request, for example, request packets in which a multicast address generated based on a predetermined rule is set, and transmits those packets to other information processing apparatuses. An information processing apparatus that receives those packets autonomously determines if it executes data extraction processing, performs content extraction processing based on the determination, stores data extracted according to the request, for example, divided data for which FEC (Forward Error Correction) and interleave processing are performed, into the packets, and transmits those packets to the information processing apparatuses that issued the reproducing request.

Although transmission control units configuring the network, such as routers, are omitted in FIG. 1 and FIG. 2, the transmission control units such as routers are provided in an actual network to select routes along which the packets passing through nodes are transmitted. The transmission control units may be provided separately from the nodes, or the nodes may have the function of the transmission control unit.

[2. Configuration of Information Processing Apparatus as a Node]

Figure 3:
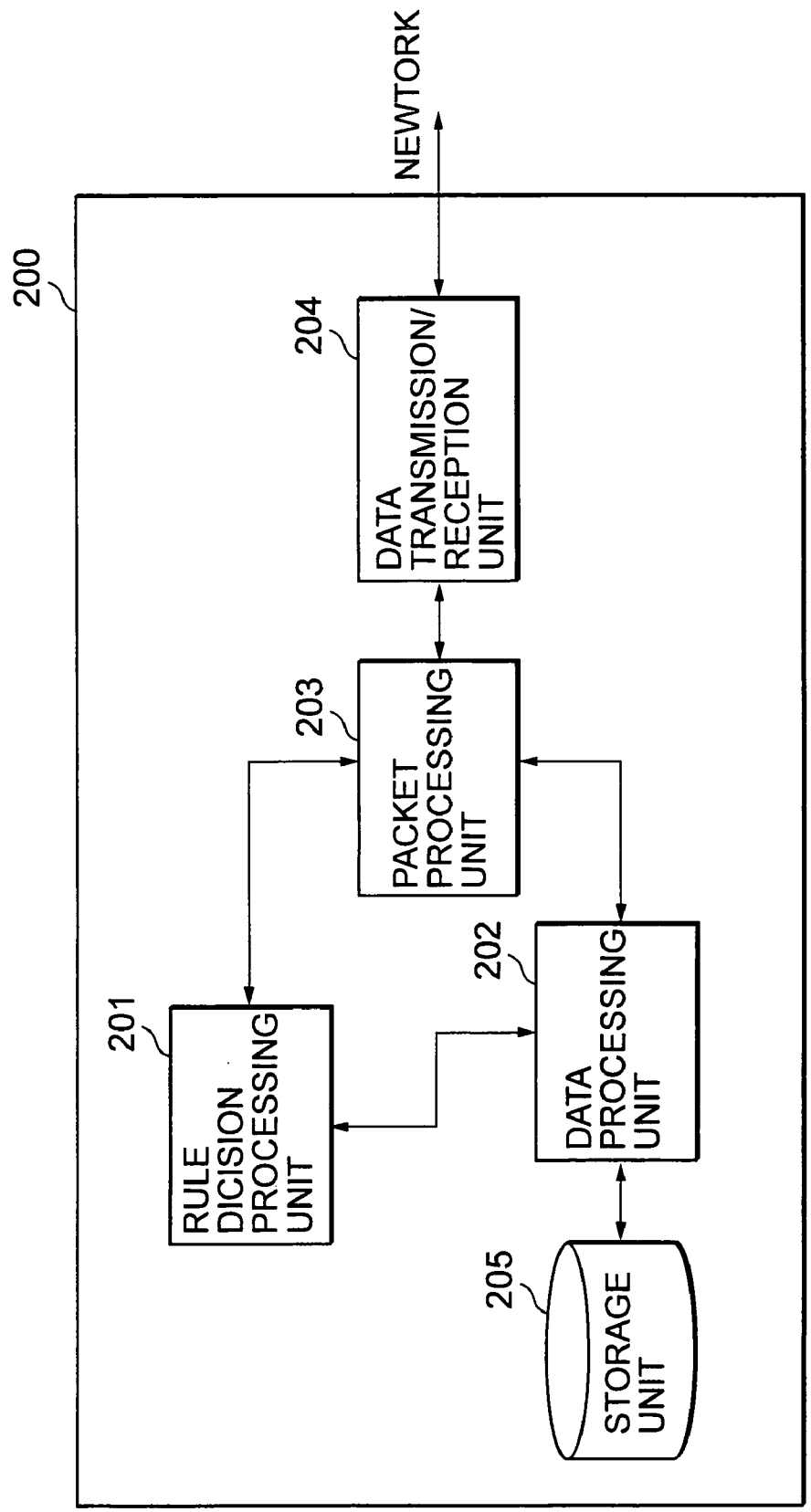
FIG. 3 is a diagram showing the configuration of an information processing apparatus (node) connected to a network.

Next, the configuration of an information processing apparatus that functions as a node will be described. FIG. 3 is a diagram showing the configuration of an information processing apparatus that functions as a node.

As shown in FIG. 3, an information processing apparatus (node) 200 comprises a rule decision processing unit 201, a data processing unit 202, a packet processing unit 203, and a data transmission/reception unit 204. The data transmission/reception unit 204 performs the output processing of transmission packets to other information processing apparatuses connected via the network and the input processing of reception packets from other information processing apparatuses.

The packet processing unit 203 performs the generation processing of packets that will be transmitted from the own information processing apparatus to other information processing apparatuses connected to the network or the analysis processing of packets received from other information processing apparatuses.

The data processing unit 202 performs processing according to the data processing programs stored in each information processing apparatus. For example, the data processing unit performs data processing based on a data processing request from other information processing apparatuses such as other recording command apparatuses or reproducing command apparatuses connected to the network, for example, for a content reproducing request, the data processing unit retrieves specified contents from a storage unit 205 and outputs them to the packet processing unit 203. For a content recording request, the data processing unit receives contents and stores them in the storage unit 205.

The rule decision processing unit 201 is a processing unit that executes processing unique to the information processing apparatus according to the present invention, and executes processing for deciding if packet-based data processing based on a probability value: $\alpha$ or $\beta$, as a [description of rule deciding condition] described in a received packet is to be executed, wherein the packet based processing is the reception of data and the storage of data into the storage unit that are executed in response to a data recording command or the extraction of data from the storage unit and transmission of data that are executed in response to a data reproducing command. In the configuration according to the present invention, the recording command execution probability is set to $\alpha$ and the reproducing command execution probability is set to $\beta$, and those probability values are set in a recording request or reproducing request packet transmitted respectively by the recording command apparatus or the reproducing command apparatus.

For example, when content recording processing is executed, packets are recorded evenly among all nodes and data is recorded in the distributed storage system with the probability $\alpha$ if the number of nodes, that is n configuring the distributed storage system is sufficiently large and the number of decoded blocks, that is q is sufficiently large.

When content reproducing processing is executed, the rule decision processing unit 201 of each node determines whether to execute the reproducing command based on the probability: $\beta$ and then execute it. Because the reproducing command is executed with a fixed probability in each node, packets are lost. However, if the reproducing execution probability $\beta$ is set so that the total of packets transmitted from a plurality of distributed nodes is sufficiently large, the original data is able to be reproduced by combining those packets and executing FEC (Forward Error Correction) based error correction.

[3. Configuration of Recording Command Apparatus and Data Recording Processing]

Figure 4:
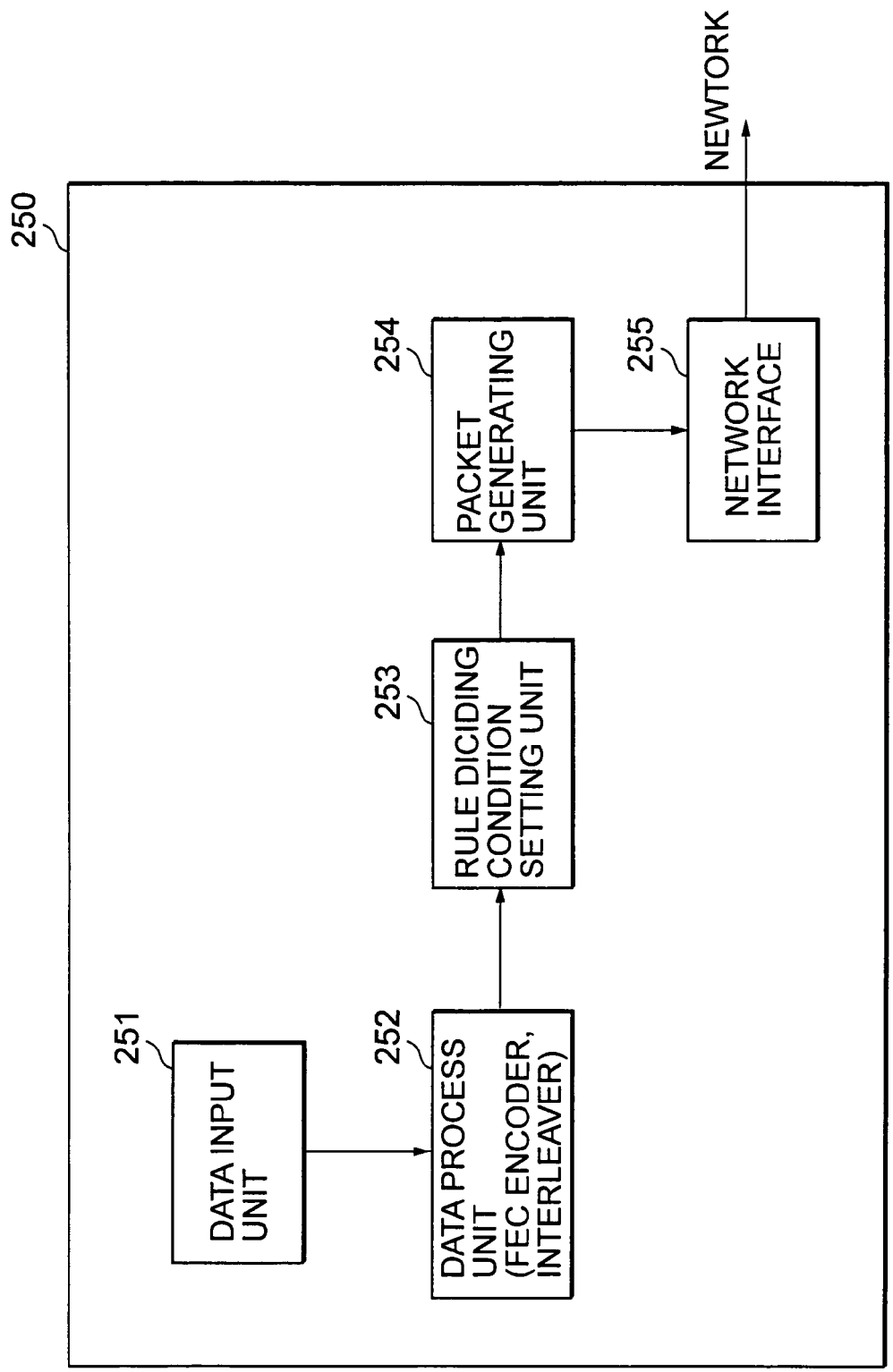
FIG. 4 is a diagram showing the configuration of a recording command apparatus.

Next, the recording command apparatus and data recording processing will be described. FIG. 4 is a diagram showing the configuration of a recording command apparatus 250. The recording command apparatus 250 comprises a data input unit 251 via which data (contents) to be recorded in a plurality of nodes is input, a data processing unit 252 that executes data processing such as FEC (Forward Error Correction) encoding and interleave processing for encoded data, a rule deciding condition setting unit 253 that sets the probability value $\alpha$ that is the above described [description of rule deciding condition], a packet generating unit 254 that generates packets in which processing data that is generated by the data processing unit 252 and the description of rule deciding condition that is set by the rule deciding condition setting unit 253 are stored and in which an address is set, and a network interface 255 via which the apparatus connects to the network.

FEC encoding is a generic name for an encoding method, such as the tornado encoding method, the reed tornado encoding method, and the turbo encoding method, in which the reception side performs error correction. The data processing unit 252 divides data entered from the data input unit 251 into p blocks and performs FEC encoding for those p blocks to convert them into q blocks. Encoding p blocks to q blocks is called encoding at the encoding rate of q/p. The recording efficiency and the transmission efficiency of the distributed storage system may be changed by changing this encoding rate q/p.

Interleave processing refers to processing in which encoded data is re-sequenced. Data is distributed by interleaving so that burst errors, which are generated by packet losses, become random errors. As a result, a lost data portion can be corrected via error correction based on FEC.

Figure 5:
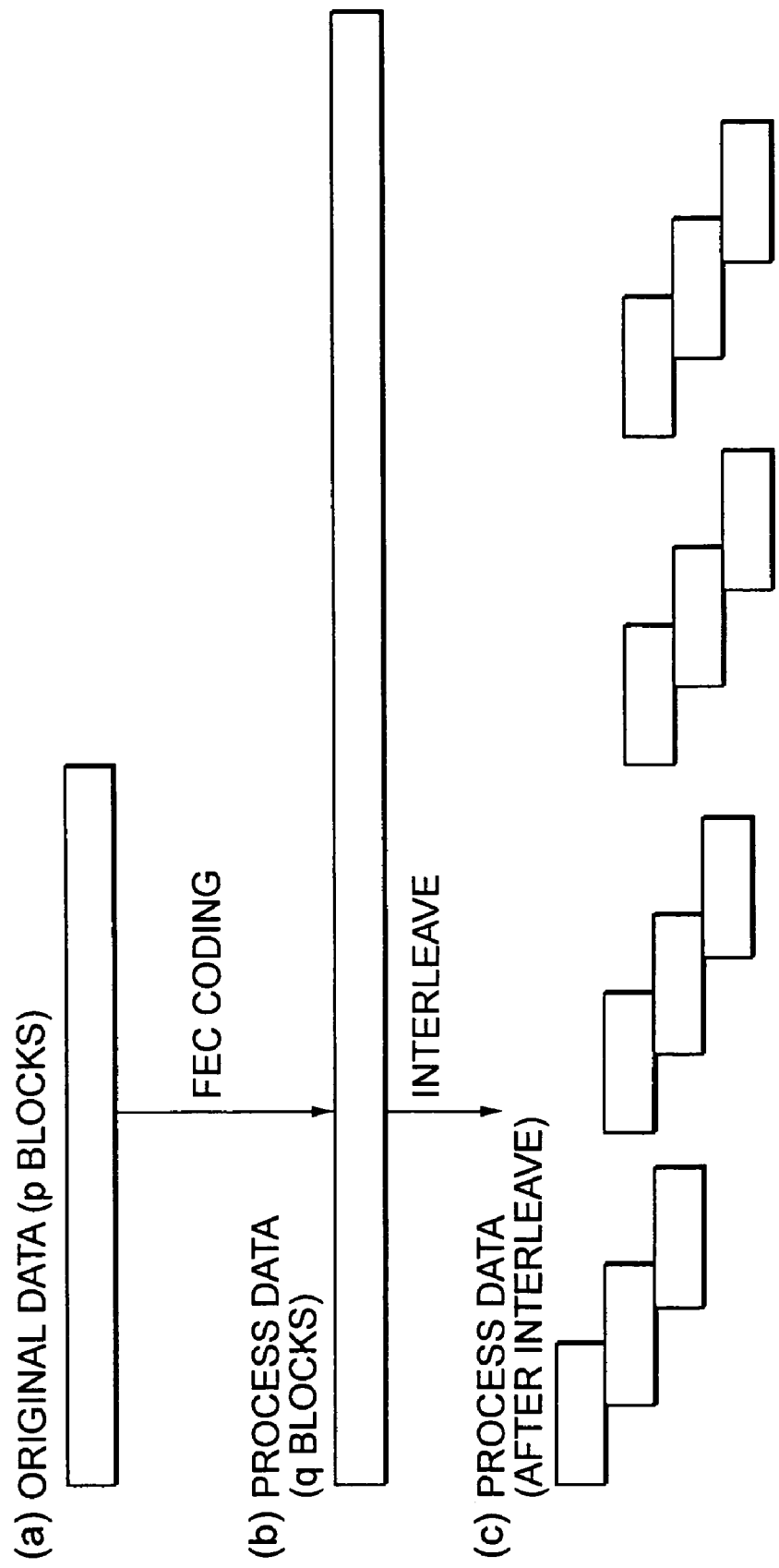
FIG. 5 is a diagram showing data FEC encoding processing and interleave processing executed by the recording command apparatus.

FEC encoding processing and interleave processing will be described with reference to FIG. 5. As shown in FIG. 5(a), the received original data is divided into p blocks. After that, as shown in FIG. 5(b), FEC encoding at the encoding rate of q/p is performed to convert the data divided into p blocks into q encoded blocks.

As described above, FEC encoding is a generic name for an encoding method, such as the tornado encoding method, the reed tornado encoding method, and the turbo encoding method, in which the reception side performs error correction. When data is encoded at the encoding rate of q/p via FEC encoding, the original message can be recovered as introduced by the research paper RIZZ097, available on the web at iet.unipi.it/~luigi/fec.html#fec.ps, even if some blocks are lost but if p or more encoded blocks survive.

Interleave processing is performed for the FEC-encoded data as shown in FIG. 5(c) to re-sequence the encoded data for data distribution. The interleaved data is output to the rule deciding condition setting unit 253 and the probability value: $\alpha$ is set as the [description of rule deciding condition] described above.

The setting processing of the probability value: $\alpha$, which is set as the [description of rule deciding condition], is associated with the processing of the data processing unit described above. When the data processing unit divides the data into p blocks and then performs encoding processing at the encoding rate of q/p in which FEC encoding is performed for the generated p blocks to convert them to q blocks, the rule deciding condition setting unit 253 sets the probability value: $\alpha$, which is the recording probability: $\alpha$ with which data is recorded in a node that receives a data recording processing request, as the description of recording rule deciding condition. The rule deciding condition setting unit 253 sets the probability value: $\alpha$ so that the relation between the number of return blocks: $q \times \alpha \times n \times \beta$ and the number of blocks, that is p becomes the relation shown below, wherein the number of return blocks can be calculated from the return probability: $\beta$ specified by the reproducing command apparatus 102 (see FIG. 1) connected to the network, the number of encoded blocks: q described above, and the number of nodes: n connected to the network:

Number of return blocks: $q \times \alpha \times n \times \beta$ > Number of blocks: $p$ This setting ensures the reliable recovery of return data from data returned from the nodes with the return probability: $\beta$ in response to a reproducing request issued from the reproducing command apparatus.

The packet generating unit 254 divides the processing data generated by the data processing unit 252 into a predetermined size, generates packets by storing the description of rule deciding condition that is set by the rule deciding condition setting unit 253 and by adding a header that includes an address and a footer, and transmits the packets via the network interface 255. The packets are sent to the nodes of the distributed storage system using the address setting according to the transmission nodes, that is, a unicast address or a multicast address.

Figure 6:
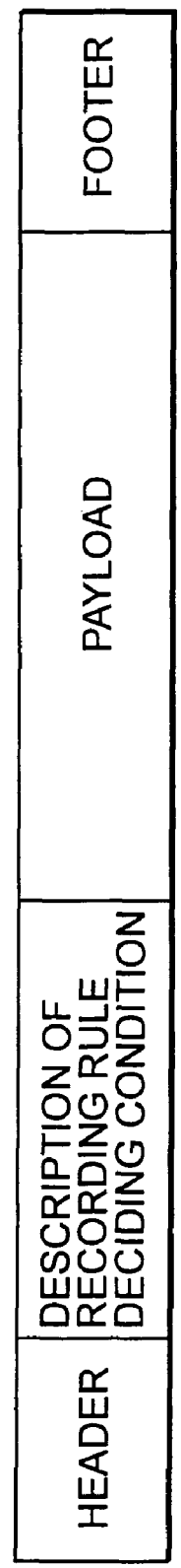
FIG. 6 is a diagram showing the configuration of a data recording processing request packet transmitted from the recording command apparatus.

FIG. 6 is a diagram showing the structure of a packet 40 generated by the packet generating unit 254. A packet comprises a header, the description of recording rule deciding condition, a payload, and a footer. The payload contains processing data (processing contents) for which the FEC encoding processing and the interleave processing have been performed. The header and the footer contain control information such as the data ID indicating the type of data, the checksum of the CRC (Cyclic Redundancy Check), the GUID (Global Unique ID) that is the unique identifier of a packet destination node, and the network address.

The description of recording rule deciding condition contains the probability: $\alpha$, which will be described later, with which each node records this packet. The rule decision processing unit 201 (see FIG. 3) of a node that receives the packet records the packet based on this recording probability $\alpha$.

All nodes of the distributed storage system decide whether to record a packet based on this recording probability. This causes the nodes of the distributed storage system to record data with the probability $\alpha$. In this distributed storage system, data is distributed with an equal probability among the nodes when the number of nodes, that is n is sufficiently large and the number of decoded blocks, that is q is sufficiently large.

It is also possible to use a configuration in which the description of recording rule deciding condition is stored in a packet separate from a packet containing processing contents, information on the link to the packet containing the description of recording rule deciding condition is stored in the packet containing the processing contents, and a node that receives the packet containing the processing contents obtains the packet containing the corresponding description of recording rule deciding condition based on the link information.

Next, the recording processing procedure will be described which, in response to a recording processing request packet from the recording command apparatus, is executed by a node which receives the packet, to determine if the node will autonomously record contents and execute processing.

Figure 7:
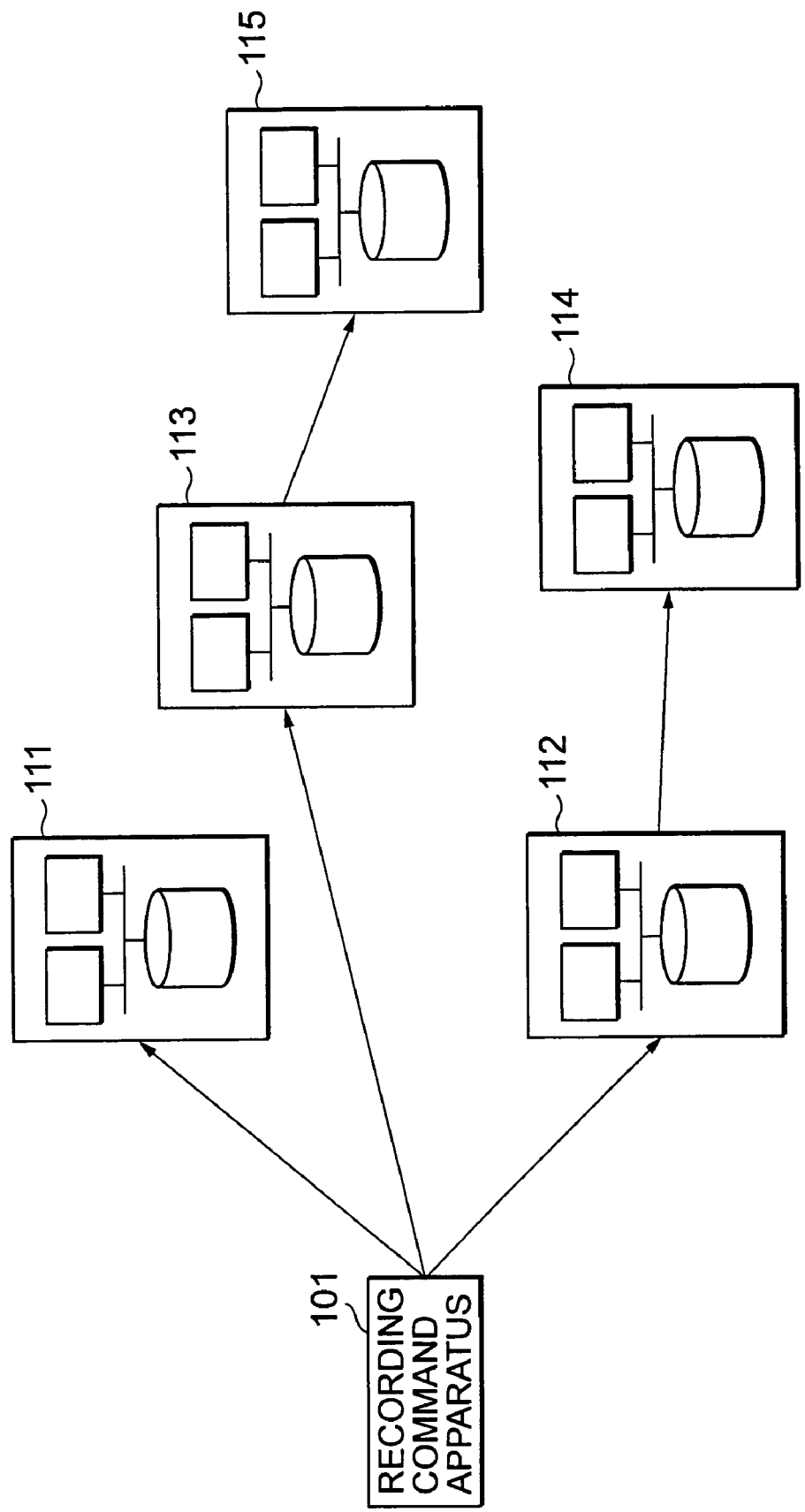
FIG. 7 is a diagram showing the transmission processing of a data recording processing request packet transmitted from the recording command apparatus to a node.

FIG. 7 is a diagram showing how the recording command apparatus 101 transmits a data recording processing request packet, which is a data recording command shown in FIG. 6, to the plurality of nodes 111 to 115. The recording command apparatus transmits the packet shown in FIG. 6, in which processing data for which FEC processing and interleave processing are performed is stored as the payload, and the probability value: α is set as the description of rule deciding condition, to the nodes in unicast mode or multicast mode.

Figure 8:
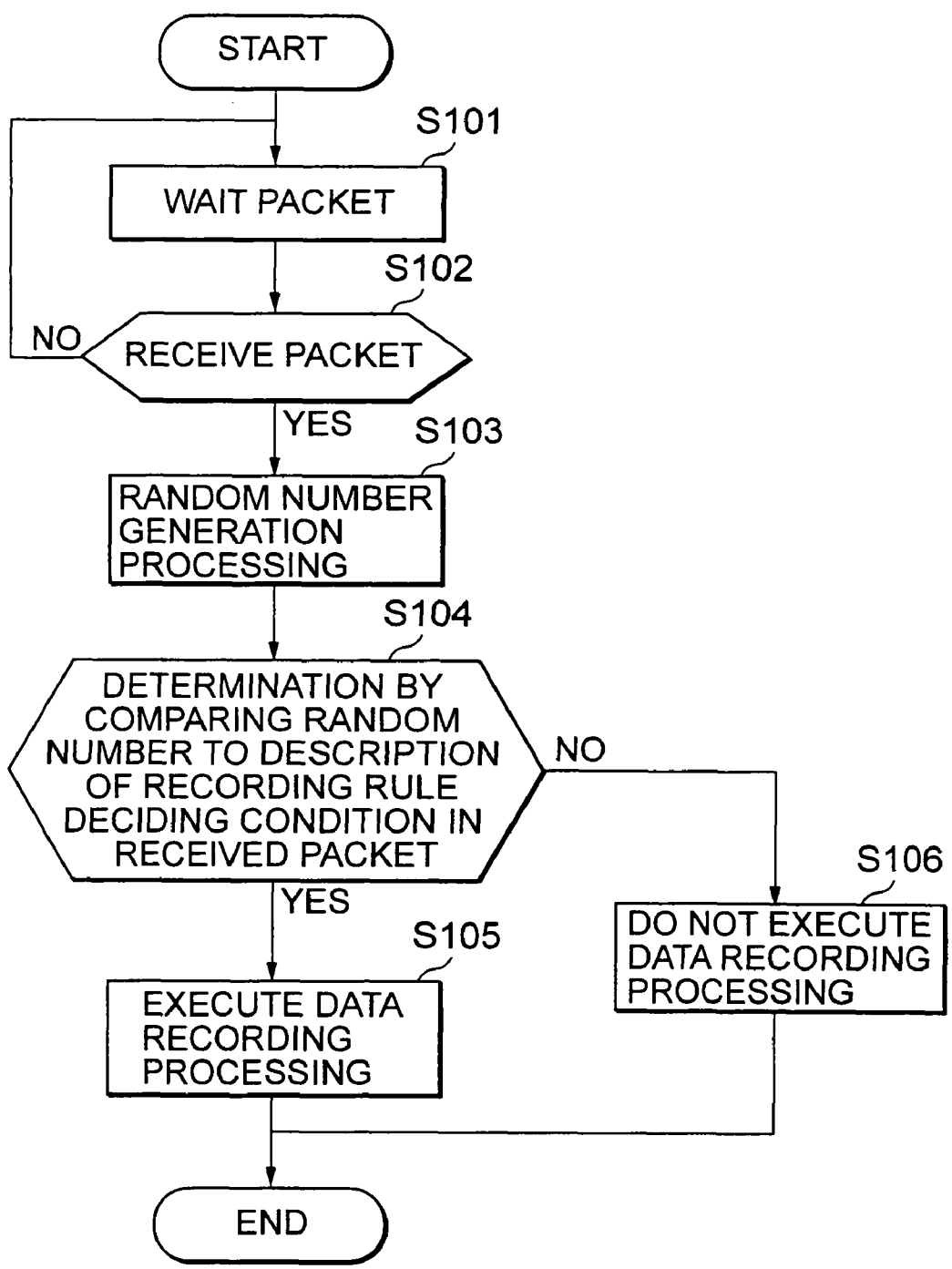
FIG. 8 is a flowchart showing the processing procedure including autonomous processing execution determination processing executed in a node that receives a data recording processing request packet from the recording command apparatus.

Referring to FIG. 8, the processing procedure that is executed in a node that receives the packet will be described. First, the information processing apparatus waits for the data recording processing request packet in step S101 and, if it is found that the packet is received in step S102, executes random number generation processing in step S103. In step S104, the information processing apparatus compares the generated random number with the probability: α specified as the description of recording rule deciding condition stored in the data recording processing request packet and, based on the comparison result, determines whether to execute the command.

For example, if the generated random number>probability α, the information processing apparatus records the processing data stored as the payload of the packet into the own storage means. If the generated random number≦probability α, the information processing apparatus does not execute data recording processing.

If the number of nodes, that is n of the distributed storage system is sufficiently large and if the number of decoded blocks, that is q is sufficiently large, the random number generated in each node is set in the range of generated random numbers so that packets are recorded among all nodes evenly and data is recorded with the probability α in the whole distributed storage system.

If it is determined that the data recording processing request should be executed as a result of the comparison processing based on the random number in step S104, control is passed to step S105. Then, the information processing apparatus extracts the processing data from the payload of the packet and records the extracted data in the storage means of the own apparatus (node). On the other hand, if it is determined that the data recording processing request should not be executed as a result of the comparison processing based on the random number, control is passed to step S106 and the information processing apparatus terminates the processing without executing the data recording processing.

As described above, the information processing apparatus that receives a data recording processing request (command) determines whether to autonomously execute the command based on the comparison between the description of recording rule deciding condition stored in the packet with the random number and performs processing according to the determination.

Figure 9:
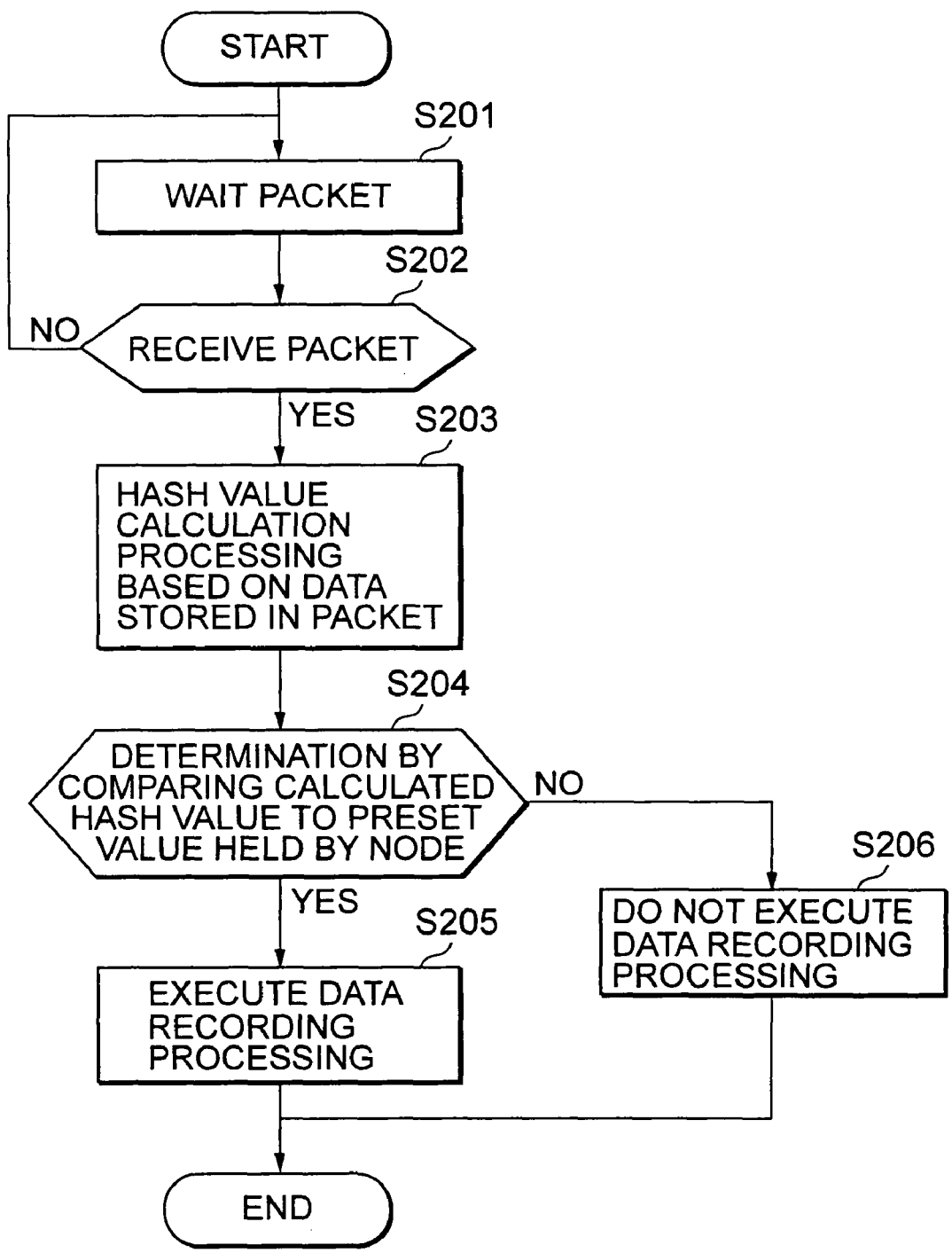
FIG. 9 is a flowchart showing the processing procedure including autonomous processing execution determination processing executed in a node that receives a data recording processing request packet from the recording command apparatus.

Next, with reference to the processing flowchart in FIG. 9, the following describes the processing in which an information processing apparatus side that receives a data recording processing request calculates a hash value and determines whether to autonomously execute the data recording processing request based on the hash value.

First, the information processing apparatus waits for a data recording processing request packet in step S201 and, if it is determined that the packet is received in step S202, executes the hash value generation processing based on the data stored in the received packet in step S203 and determines whether to execute the command based on the generated hash value in step S204.

For example, the information processing apparatus has a setting value, which is a predetermined threshold value, in the storage unit. The information processing apparatus executes the command if the generated hash value>setting value but does not if the generated hash value≦setting value.

Data stored in a data processing request packet for use in generating the hash value is as shown in FIG. 10. For example, the identifier (data ID) of the content data or a part of data, for example, the predetermined number (n) of bits from the start of the data, may be set as the data for hash generation. To calculate the hash value, a function such as MD5 may be used and, as shown in FIG. 10, the hash value is generated via MD5 using the data ID or the hash value is generated via MD5 using the data contents.

If it is determined that the data recording processing request should be executed as the determination result based on the hash value in step S204, control is passed to step S205 and the information processing apparatus extracts the processing data from the payload of the packet and records the extracted data in the storage means of the own apparatus (node). On the other hand, if it is determined that the data recording processing request should not be executed as the result of comparison processing based on the hash value, control is passed to step S206 and the information processing apparatus terminates the processing without executing the data recording processing.

As described above, an information processing apparatus that receives a data recording processing request (command) autonomously determines whether to execute the command based on the comparison between the hash value of the data stored in the packet with the setting value in each node and performs processing according to the determination.

[4. Configuration of Reproducing Command Apparatus and Data Reproducing Processing]

Figure 11:
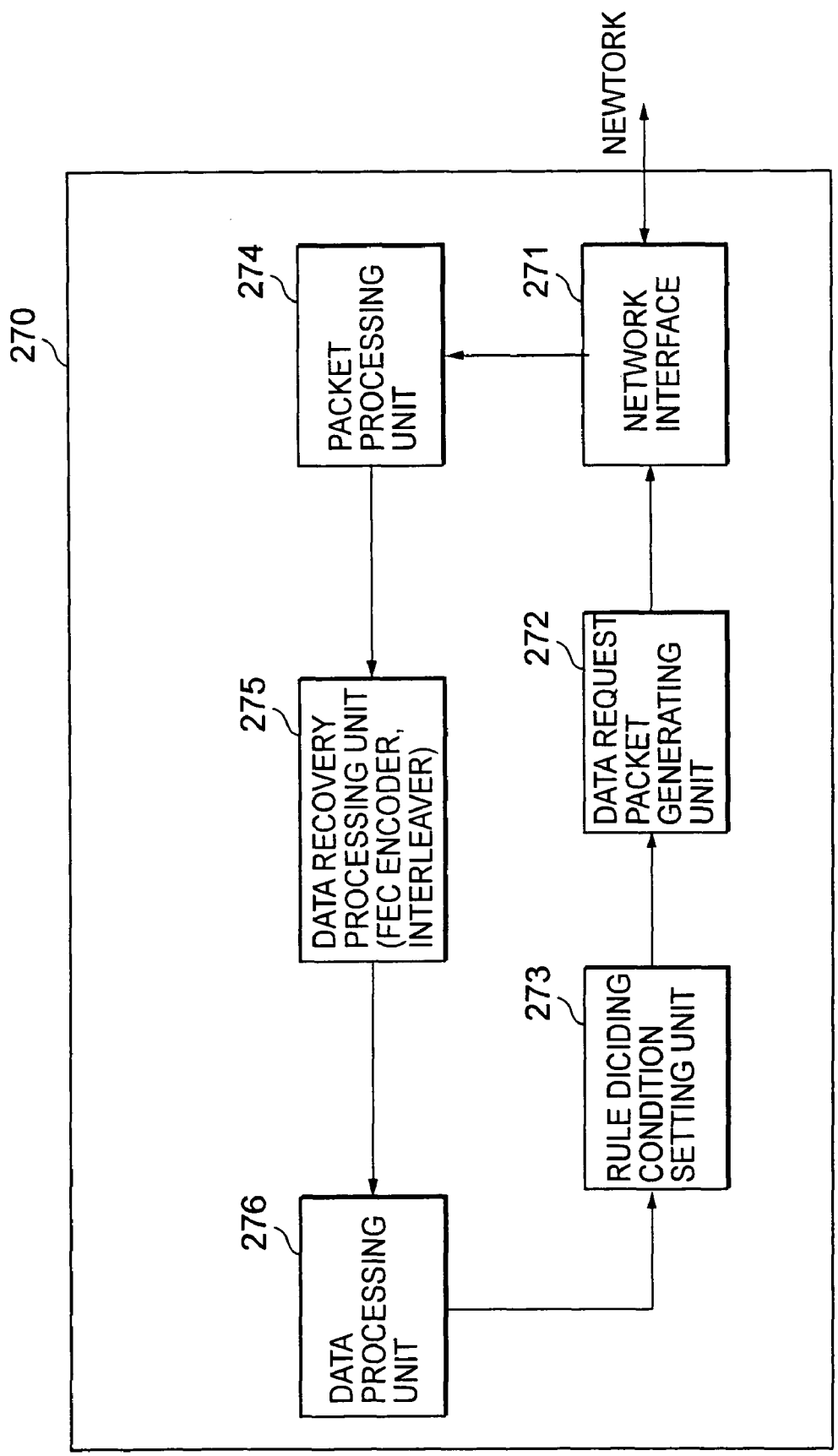
FIG. 11 is a diagram showing the configuration of a reproducing command apparatus.

Next, the following describes the reproducing command apparatus 102 (see FIG. 1) that transmits a data reproducing command to the nodes, receives the reproducing data from the nodes, and executes data reproducing processing. FIG. 11 is a diagram showing the configuration of a reproducing command apparatus 270. The reproducing command apparatus 270 comprises a network interface 271 that transmits and receives data to or from an external apparatus via the network, a data request packet generating unit 272 that generates packets that request the nodes to transmit reproducing data specifying data to be reproduced, and a rule deciding condition setting unit 273 that determines the probability value: β used as the [description of rule deciding condition] that is set in a data request packet.

In addition, the network interface 271 receives reproducing data storing packets from the nodes, and a packet processing unit 274 of the reproducing command apparatus 270 combines data that are divided into packets. A data recovery processing unit 275 performs de-interleave processing and FEC decoding processing for data extracted from the received packets in order to recover content data. The recovered data is inputted to a data processing unit 276 and is outputted to an external apparatus such as a monitor or a speaker (omitted in the figure) or is stored in a recording apparatus not shown.

The data request packet generating unit 272 transmits a packet, which requests data, to the nodes of a distributed storage system. FIG. 12 is a diagram showing the configuration of a packet that requests data. A packet comprises a header, the description of a reproducing rule deciding condition, the description of request, and a footer. The description of request contains the data ID that identifies data that is requested. The header and the footer contain control information such as the checksum of the CRC, the network address and GUID of the node, and the sequence number indicating the sequence of data.

The description of reproducing rule deciding condition contains the return probability $\beta$ determined by the rule deciding condition setting unit 273. The return probability $\beta$ is a variable used by a node, which receives the packet, to determine whether to return data. Some nodes decide to return data based on this variable, but some others do not. The return probability $\beta$ is a value viewed from the macro viewpoint of the whole distributed storage system, and the probability that the nodes of the whole distributed storage system return data is $\beta$. Therefore, when the distributed storage system has n nodes, the rate of returned packets is the number of nodes multiplied by the return probability $\beta$, that is, $n \times \beta$.

Figure 13:
FIG. 13 is a diagram showing the configuration of a packet transmitted from a node, which receives a data reproducing processing request packet, to the reproducing command apparatus.

The packet processing unit 274 combines the packets returned from the nodes. FIG. 13 is a diagram showing the data structure of a packet returned from a node. As shown in FIG. 13, the packet comprises a header, a payload, and a footer. The payload contains data extracted from the storage unit of each node, that is, the data blocks for which the FEC processing and the interleave processing described with reference to FIG. 5 have been performed. The header and the footer contain control information such as the checksum of the CRC, the network address of the reception side node, and the sequence number indicating the sequence of the packet.

When the reproducing command apparatus 102 receives the packets shown in FIG. 13, the packet processing unit 274 analyzes the packets, reproduces the sequence numbers, re-sequences the received packets, removes the control information such as the header and the footer, and combines the packets according to the sequence numbers.

The data recovery processing unit 275 de-interleaves the received data blocks, rearranges the data, and performs FEC decoding for the de-interleaved data to recover the original data.

Figure 14:
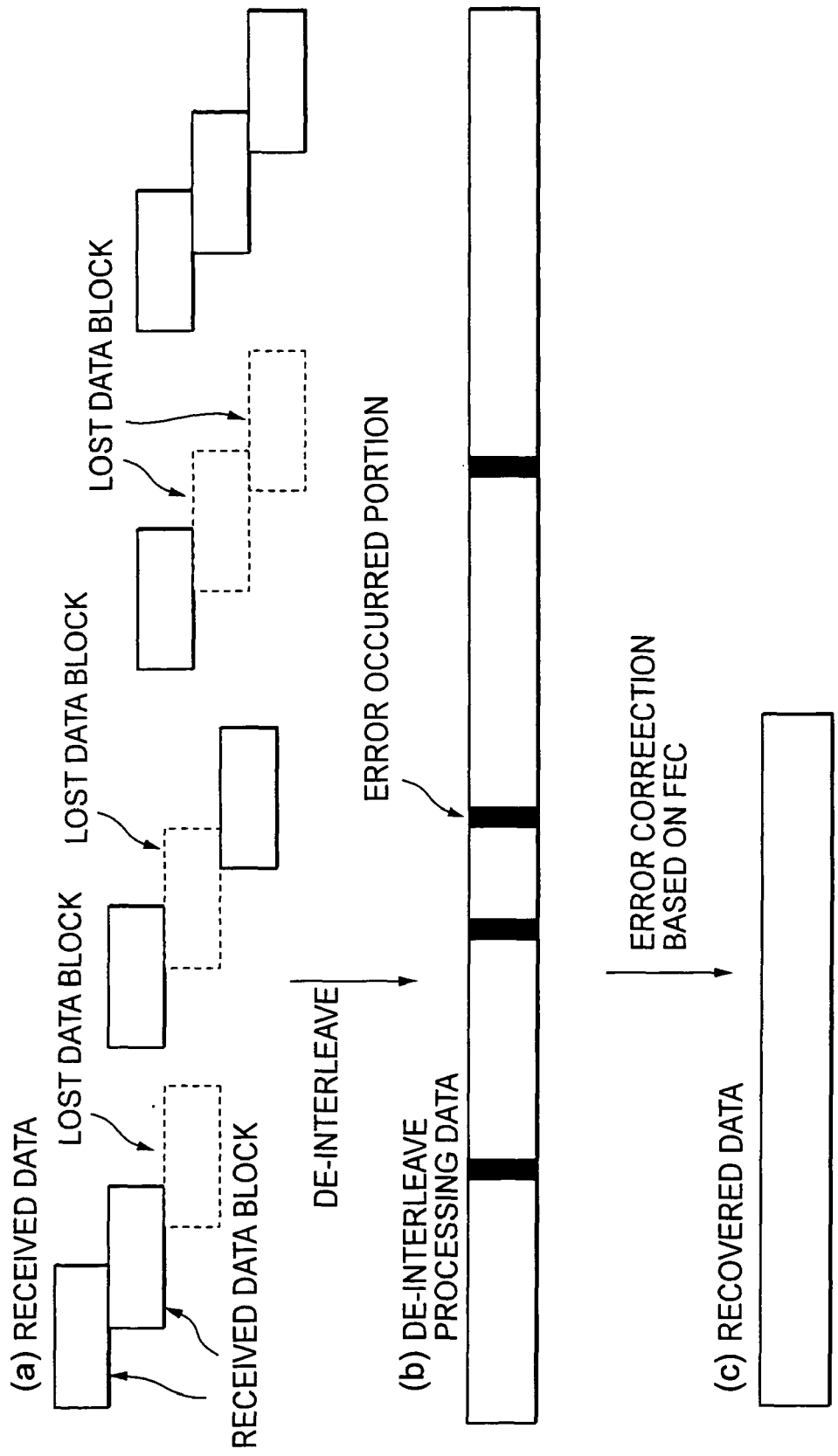
FIG. 14 is a diagram showing data de-interleave processing and FEC decoding processing executed by the reproducing command apparatus.

Data recovery processing based on the FEC and de-interleave processing will be described with reference to FIG. 14. As shown in FIG. 14(a), some received packets from the nodes are lost on the network and therefore the received data blocks and the lost data blocks are mixed.

The received data blocks are block data generated by performing the FEC encoding at the encoding rate of q/p to convert data divided into p blocks to q encoded blocks as shown above in FIG. 5.

The data recovery processing unit 275 of the reproducing command apparatus first de-interleaves the received data blocks, re-sequences the data, and generates the de-interleaved data shown in FIG. 14(b). The de-interleaved data includes the lost packets, that is, the data loss portions based on the lost blocks. However, the de-interleaved processing makes those errors random errors composed of small data areas rather than burst errors in which error portions are large data areas. Such random errors composed of small data areas can be eliminated through FEC.

The data recovery processing unit 275 executes error correction through FEC for the de-interleaved data shown in FIG. 14(b) and generates the recovered data shown in FIG. 14(c). As described above, FEC encoding is a generic name for an encoding method, such as the tornado encoding method, the reed tornado encoding method, and the turbo encoding method, in which the reception side performs error correction. When data is encoded at the encoding rate of q/p via FEC encoding, the original message can be recovered as introduced by the research paper RIZZ097, available on the web at iet.unipi.it/~luigi/fec.html#fec.ps, even if some blocks are lost but if p or more encoded blocks survive.

The data recovered by the data recovery processing unit 275 is outputted to the data processing unit 276. The data processing unit 276 stores the decoded data in a recording unit not shown or outputs the decoded data to an output unit such as a monitor or a speaker via the output interface.

The distributed storage system according to the present invention, which is a system that records data in the nodes with the recording probability $\alpha$ and returns the data, recorded in the nodes, at the return probability $\beta$, returns the original data output from the recording command apparatus 101 shown in FIG. 1 at the rate $\alpha \times n \times \beta$. For example, when p blocks are encoded into q blocks, $q \times \alpha \times n \times \beta$ blocks are returned. If the number of returned blocks is larger than the number of blocks, that is p before decoding, the data can be decoded as described in the above described thesis RIZZ097. Therefore, the intended data can be decoded by determining the values of $\alpha$, $\beta$, and q/p so that the number of returned blocks is larger than p.

That is, when the reproducing data stored in the nodes is encoded data with the encoding rate q/p generated by converting p blocks into q blocks through FEC encoding, the rule deciding condition setting unit 273 of the reproducing command apparatus 270 sets the probability value $\beta$ so that the relation between the number of return blocks, that is $q \times \alpha \times n \times \beta$ and the number of blocks, that is p becomes the relation shown below, wherein the number of return blocks can be calculated from the reproducing probability: $\alpha$ specified by the reproducing command apparatus connected to the network, the return probability: $\beta$, p, q, the number of encoded blocks: q described above, and the number of nodes: n connected to the network:

Number of return blocks: $q \times \alpha \times n \times \beta >$ Number of blocks: $p$ This setting ensures the reliable recovery of data from return data returned from the nodes with the return probability: $\beta$ in response to a reproducing request issued from the reproducing command apparatus.

As described above, the encoding rate q/p, the recording probability $\alpha$, and the return probability $\beta$ should be set in the distributed storage system in this embodiment so that the following relation is satisfied.

$$p \geq q \times \alpha \times n \times \beta$$

The recording efficiency and the transmission efficiency of data may be changed by changing the encoding rate q/p, the recording probability $\alpha$, and the return probability $\beta$ within a range satisfying the above expression. The following describes an example of setting of the parameters q/p, $\alpha$, and $\beta$.

For example, when the value of the recording probability $\alpha$ is increased and the value of the return probability $\beta$ is decreased for data that receives a very large number of return requests, the amount of data transmitted from the nodes is decreased and the data search processing and the data transmission processing at the nodes are simplified.

When the value of the encoding rate q/p is increased instead of increasing the value of the recording probability α and the return probability β is decreased, the data search processing and the data transmission processing at the nodes can also be simplified.

When the encoding rate q/p is decreased and the recording probability α is increased, the number of packets to be transmitted can be kept to a minimum. This is efficient when p is sufficiently large. Decreasing the recording probability α and decreasing the encoding rate q/p can prevent the same packet from being recorded in a plurality of nodes. This is efficient when p is sufficiently small.

When the return probability β is increased and the recording probability α or the encoding rate q/p is decreased, the amount of encoded data recorded in the whole distributed storage system can be decreased. Alternatively, when the values of α, β, and q/p are controlled so that a×n×α×q×β becomes sufficiently larger than p where a is the packet loss probability at data recording time, output time, or transmission time, a sufficient amount of data can be returned.

The arrival probability of unique packets can be increased by mathematically estimating the number of unique packets to be returned from a plurality of nodes and by increasing the recording probability, the return probability, and the encoding rate.

Next, the reproducing processing procedure will be described in which, in response to a reproducing processing packet transmitted from the reproducing command apparatus, a node, which receives a packet, determines whether to autonomously extract and transmit contents.

Figure 15:
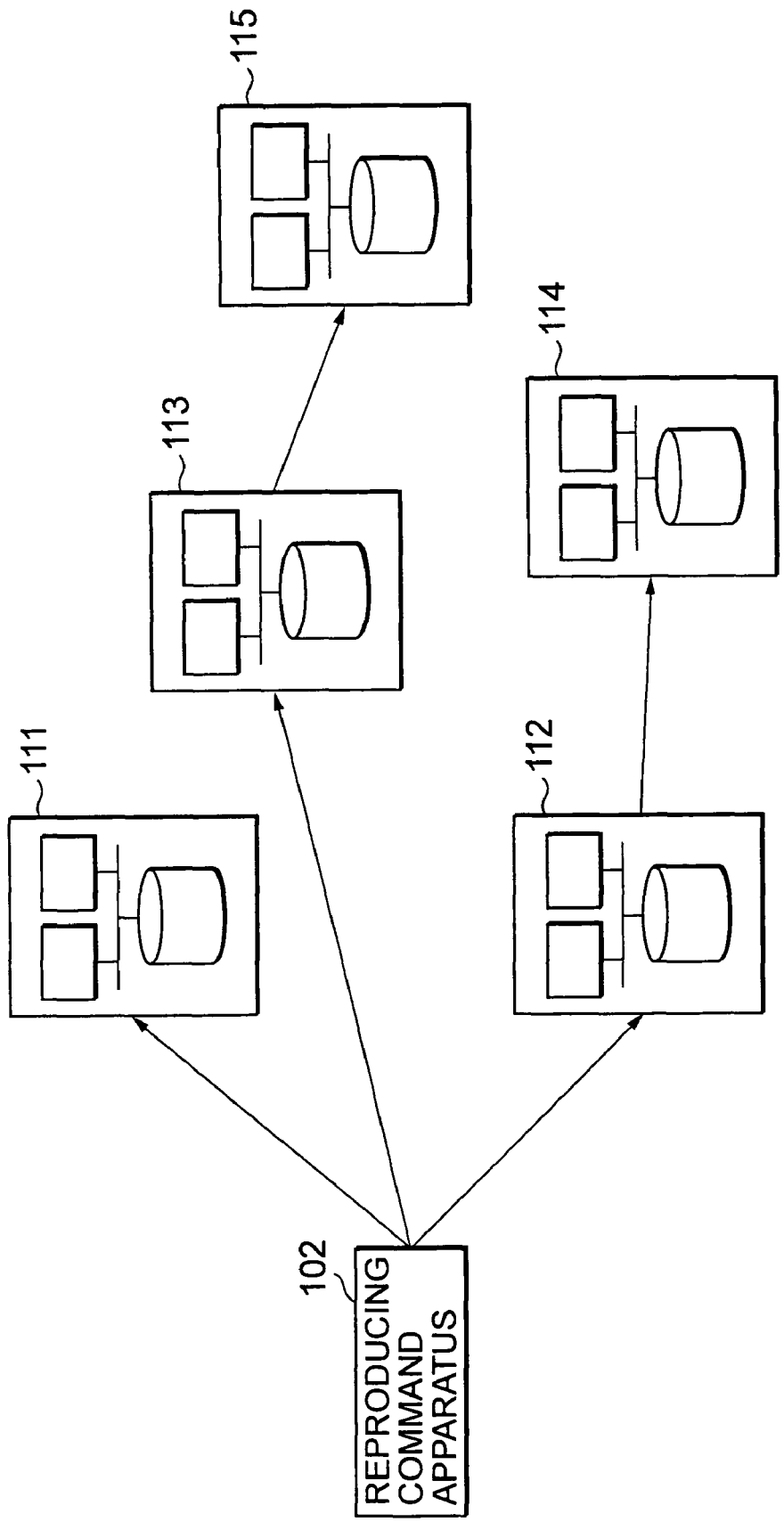
FIG. 15 is a diagram showing the transmission processing of a data reproducing processing request packet transmitted from the reproducing command apparatus to a node.

FIG. 15 is a diagram showing the processing in which the reproducing command apparatus 102 transmits the data reproducing processing request packet, shown in FIG. 12, to the plurality of nodes 111 to 115 as the data reproducing command. The reproducing command apparatus sets the identifier of the specification data to be reproduced, for example, the content ID, GUID, and so on, as the description of request, generates the data reproducing processing request packet, shown in FIG. 12, in which the probability value: β which is the description of rule deciding condition is set, and delivers the packet to the nodes in unicast or multicast mode.

Figure 16:
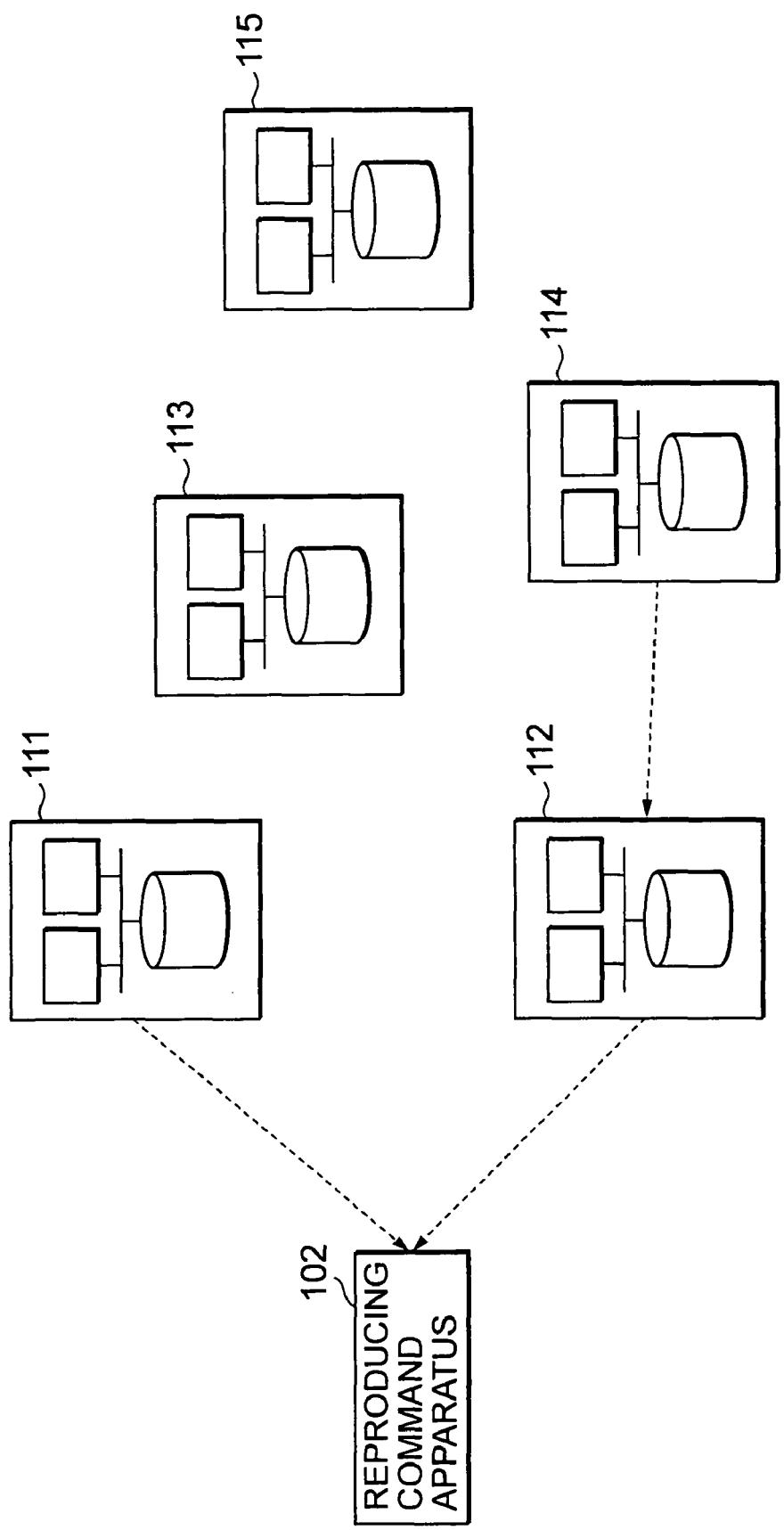
FIG. 16 is a diagram showing the transmission processing of a data storing packet transmitted from a node that receives a data reproducing processing request packet from the reproducing command apparatus.

FIG. 16 shows processing in which nodes that receive the data reproducing processing request packet, shown in FIG. 12, autonomously determine whether to execute the data reproducing processing according to the reproducing command, that is, whether to reproduce specified data from the storage unit of the own node, generate packets, and transmit the packets and in which only the nodes that decide to execute the processing generate packets (see FIG. 13) whose payload contains processing data, generated by performing the FEC processing and interleave processing described in FIG. 6, and then transmit the generated packets to the reproducing command apparatus 102.

Figure 17:
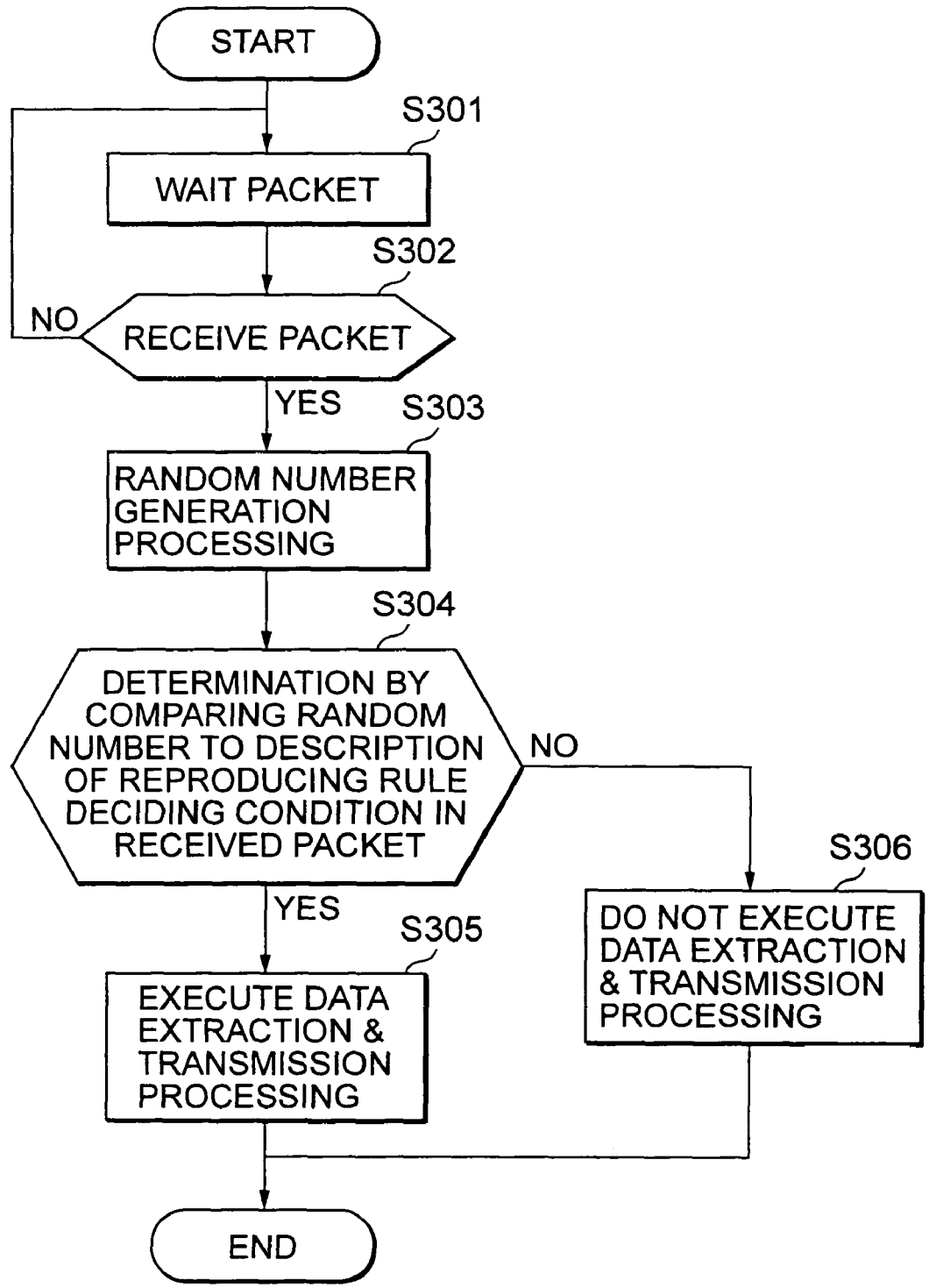
FIG. 17 is a flowchart showing the processing procedure including autonomous processing execution determination processing executed in a node that receives a data reproducing processing request packet from the reproducing command apparatus.

Referring to FIG. 17, the processing procedure that is executed in a node that receives the data reproducing processing request packet, shown in FIG. 12, in which the probability value β is set as the description of rule deciding condition will be described. First, the information processing apparatus waits for the data reproducing processing request packet in step S301 and, if it is found that the packet is received in step S302, executes random number generation processing in step S303. In step S304, the information processing apparatus compares the generated random number with the probability β specified as the description of reproducing rule deciding condition stored in the data reproducing processing request packet and, based on the comparison result, determines whether to execute the command.

For example, if the generated random number>probability β, the information processing apparatus extracts the specified content from the own storage means, generates packets whose payload contains the extracted data (see FIG. 13), and transmits the packets to the reproducing command apparatus. If the generated random number≦probability β, the information processing apparatus does not execute data reproducing processing.

If it is determined that the data reproducing processing request should be executed as a result of the comparison processing based on the random number in step S304, control is passed to step S305. Then, the information processing apparatus extracts the processing data from the storage means of the own apparatus (node), generates packets whose payload contains the extracted data (see FIG. 13) and transmits the packets to the reproducing command apparatus. On the other hand, if it is determined that the data reproducing processing request should not be executed as a result of the comparison processing based on the random number, control is passed to step S306 and the information processing apparatus terminates the processing without executing the data reproducing processing.

As described above, the information processing apparatus that receives a data reproducing processing request (command) determines whether to autonomously execute the command based on the comparison between the description of reproducing rule deciding condition stored in the packet with the random number and performs processing according to the determination.

Figure 18:
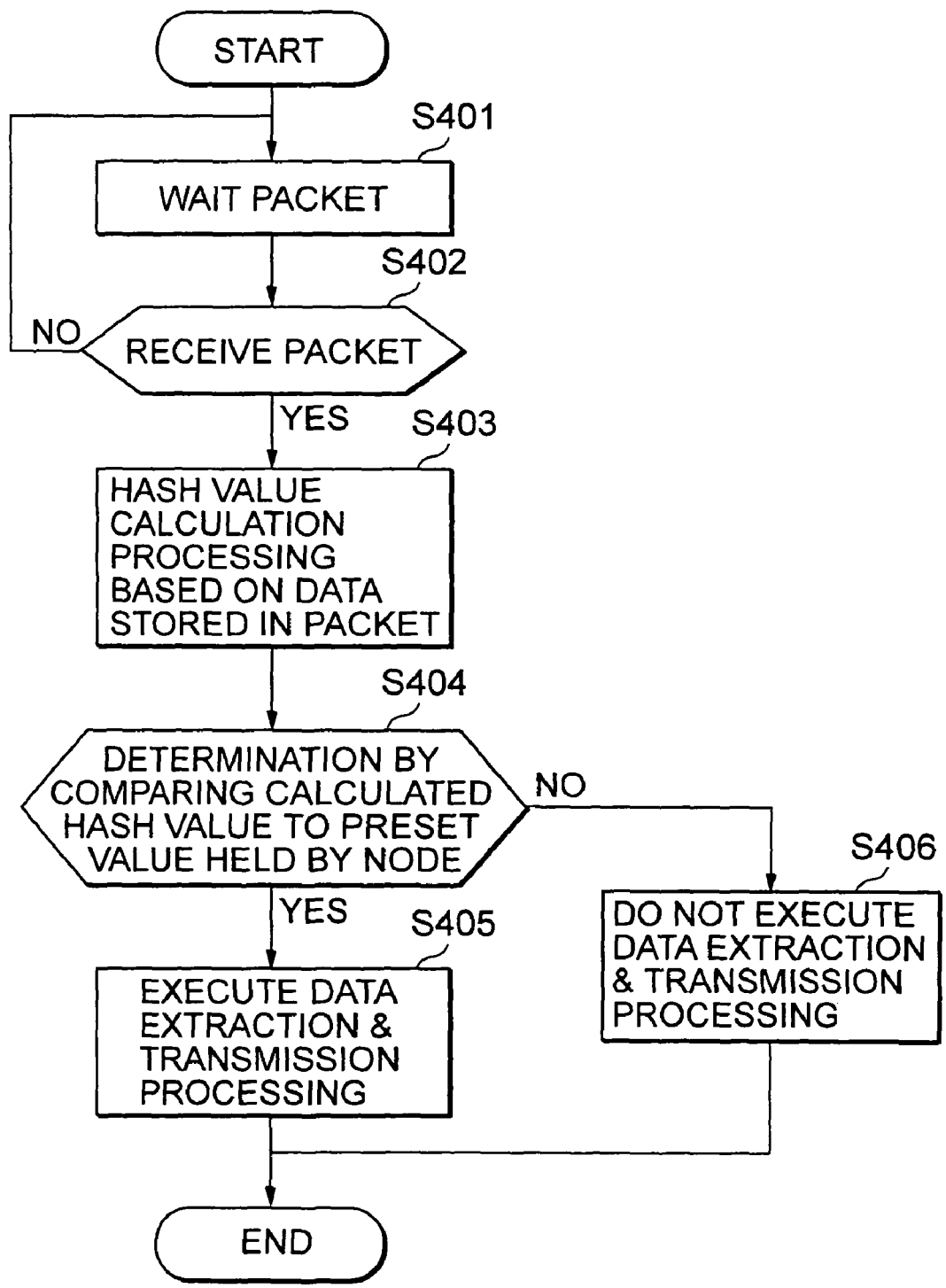
FIG. 18 is a flowchart showing the processing procedure including autonomous processing execution determination processing executed in a node that receives a data reproducing processing request packet from the reproducing command apparatus.

Next, with reference to the processing flowchart in FIG. 18, the following describes the processing in which an information processing apparatus side that receives a data reproducing processing request calculates a hash value and determines whether to autonomously execute the data reproducing processing request based on the hash value.

First, the information processing apparatus waits for a data reproducing processing request packet in step S401 and, if it is determined that the packet is received in step S402, executes the hash value generation processing based on the data stored in the received packet in step S403 and determines whether to execute the command based on the generated hash value in step S404.

For example, the information processing apparatus has a setting value, which is a predetermined threshold value, in the storage unit. The information processing apparatus executes the command if the generated hash value>setting value but does not if the generated hash value≦setting value.

For generating a hash value, the data shown in FIG. 10, such as the identifier (data ID) of the content data or a part of data, for example, the x bits from the start of the data, may be set as the data for hash generation as in the determination of the data recording request processing described above. To calculate the hash value, a function such as MD5 may be used and, as shown in FIG. 10, the hash value is generated via MD5 using the data ID or the hash value is generated via MD5 using the data contents.

If it is determined that the data reproducing processing request should be executed as the determination result based on the hash value in step S404, control is passed to step S405 and the information processing apparatus extracts the processing data from the storage means of the own apparatus (node), generates packets (see FIG. 13) whose payload contains the extracted data, and transmits the generated packets to the reproducing command apparatus. On the other hand, if it is determined that the data reproducing processing request should not be executed as the result of comparison processing based on the hash value, control is passed to step S406 and the information processing apparatus terminates the processing without executing the data reproducing processing.

As described above, an information processing apparatus that receives a data reproducing processing request (command) autonomously determines whether to execute the command based on the comparison between the hash value of the data stored in the packet with the setting value in each node and performs processing according to the determination.

[5. Data Recording/Reproducing Processing Sequence]

Figure 19:
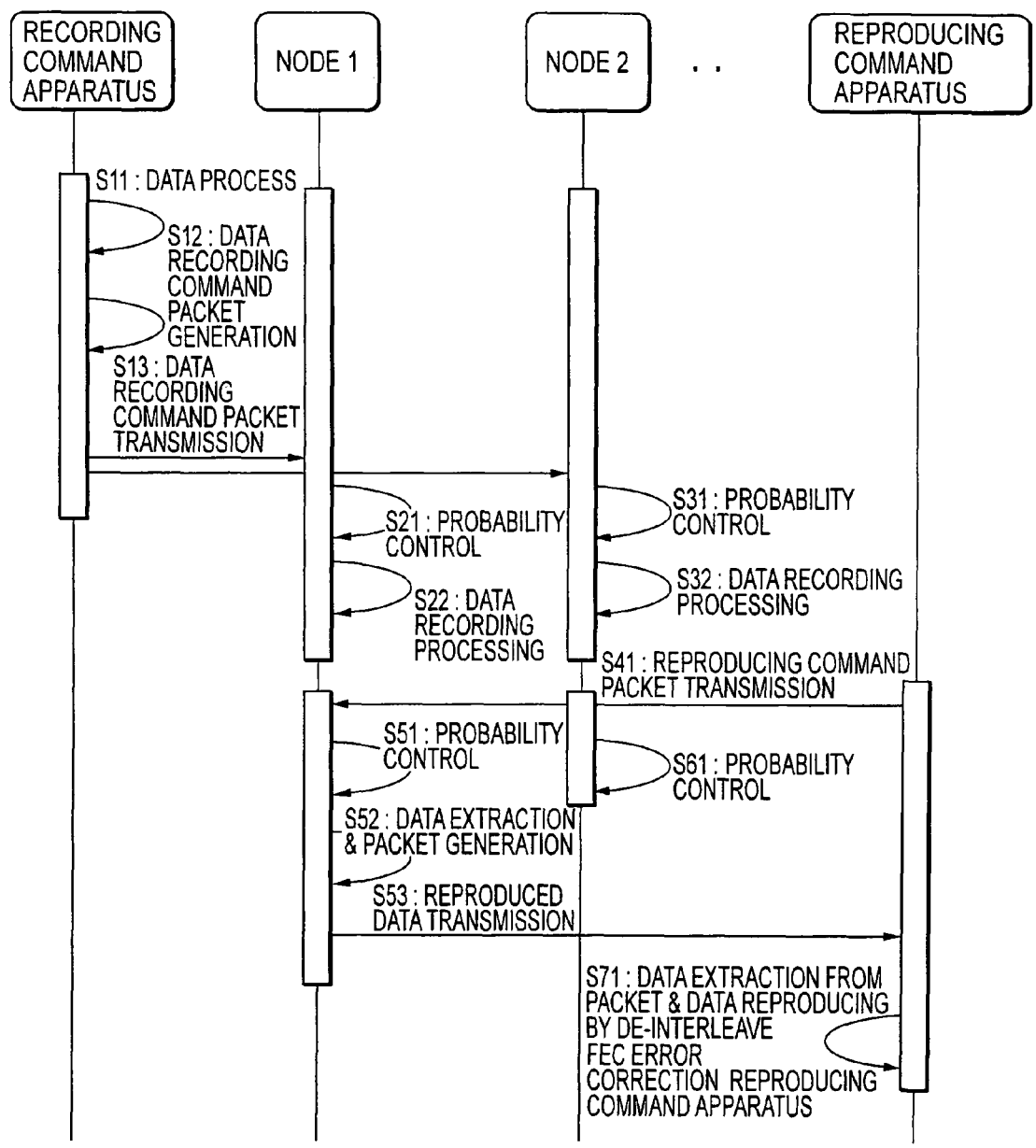
FIG. 19 is a sequence diagram showing a data recording processing request from the recording command apparatus, data recording processing in a node, a data reproducing processing request from the reproducing command apparatus, data extraction and transmission processing in a node, and reproducing processing in the reproducing command apparatus.

Next, with reference to FIG. 19, a series of processing sequences including the issuance of a data recording processing request from a recording command apparatus to nodes, data recording processing in a node, the issuance of a data reproducing processing request from a reproducing command apparatus to nodes, the extraction of data in a node, and packet transmission processing will be summarized.

First, a recording command apparatus processes recording data (contents), that is, executes FEC processing and interleave processing, in step S11. This is the processing described above with reference to FIG. 5.

Next, the recording command apparatus generates a data recording processing request (command) packet in step S12. The recording command apparatus generates packets in which the interleaved data is stored as the payload and the probability value: $\alpha$, determined by the rule deciding condition setting unit 253 (see FIG. 4), is set as the [description of rule deciding condition].

Next, the recording command apparatus transmits the packets to the nodes of the distributed storage system in step S13 using an address setting, that is, a unicast or a multicast according to the transmission node.

The processing executed in a node that receives the data recording processing request (command) packet from the recording command apparatus is executed by autonomously determining if the processing should be executed as described with reference to FIG. 8 and FIG. 9. Although the processing of two nodes (nodes 1, 2) is shown in FIG. 19, many other nodes autonomously make determination (probability control). Some nodes execute data recording processing, while others do not.

The two nodes (nodes 1, 2) shown in FIG. 19 execute the probability control processing in step S21 or S31, that is, the nodes determine if the processing is to be executed based on the comparison between the generated random number described with reference to FIG. 8 and the probability: $\alpha$ that is set in the received packet (data recording processing request packet) as the description of recording rule deciding condition or based on the comparison between the hash value based on the data in the packet described with reference to FIG. 9 and the setting value in the node.

The two nodes (nodes 1 and 2) shown in FIG. 19 both obtain a conclusion that the data recording processing is to be executed as the result of the probability control processing in steps S21 and S31 and execute the data recording processing in steps S22 and S32. The data that is recorded is the processing data which is stored in the data recording processing request packet received from the recording command apparatus and for which the FEC processing and the interleave processing have been performed.

Next, the reproducing command apparatus transmits the reproducing processing request (command) packet (see FIG. 12) to the nodes in step S41. This packet is a packet in which the ID of the contents to be reproduced and so on are stored as the description of request and in which the description of reproducing rule deciding condition (probability: $\beta$) is set.

The nodes that receive the reproducing processing request (command) packet (see FIG. 12), that is, the two nodes (nodes 1, 2) shown in FIG. 19, execute the probability control processing in steps S51 and S61. That is, the nodes determine if the processing is to be executed based on the comparison between the generated random number described with reference to FIG. 17 and the probability: $\beta$ that is set in the received packet (data recording processing request packet) as the description of reproducing rule deciding condition or based on the comparison between the hash value based on the data in the packet described with reference to FIG. 18 and the setting value in the node.

The node 1 shown in FIG. 19 obtains a conclusion that the data reproducing processing will be executed as a result of the probability control processing in step S51, obtains the corresponding data from the storage unit of the own node according to the description of request in the reproducing processing request (command) packet in step S52, generates packets (see FIG. 13) whose payload contains the obtained data, and transmits the packets to the reproducing command apparatus in step S53.

On the other hand, the node 2 shown in FIG. 19 obtains a conclusion that the data reproducing processing will not be executed as a result of the probability control processing in step S61 and terminates the processing without executing the data extraction and packet generation/transmission processing.

Although FIG. 19 shows the configuration in which data is transmitted only from the node 1 to the reproducing command apparatus, the data storing packets are transmitted from the nodes 3 to n, not shown, to the reproducing command apparatus and thus the reproducing command apparatus receives many packets from many nodes.

The reproducing command apparatus that receives packets, which contain reproduced data, de-interleaves the received data blocks, arranges the data, performs FEC encoding for the de-interleaved data, and recovers the original data in step S71.

The recovery processing based on the FEC processing and de-interleave processing is as described before with reference to FIG. 14. Errors are changed from burst errors, in which the error portion is a large area, to random errors through the de-interleave processing even if some packets are lost, and the FEC decoding processing recovers the original data.

In this way, an information processing apparatus that receives a data recording or reproducing processing request (command) can autonomously determine whether to execute the command and perform processing according to the determination based on the description of recording rule deciding condition or the description of reproducing rule deciding condition stored in the processing request packet or on other data in the packet.

As described above, the distributed storage system in this embodiment records data in distributed locations by transmitting packets, in which the recording probability $\alpha$ is described, to the nodes of the system. The system causes the nodes to return the data with there turn probability $\beta$ to retrieve the data. Writing data in the distributed nodes in this way allows data to be stored with no concentrated data management load on one server. In addition, because multiple nodes share one piece of data, the amount of data necessary in the whole system can be reduced.

Receiving data from multiple nodes prevents the traffic from being concentrated on one server, thus transmitting and receiving data in stable communication amounts.

The transmission efficiency and the amount of recording data can be changed by changing the values of α, β, and q/p. In addition, when packets are lost at data recording time, output time, or transmission time, the parameter values α, β, and q/p can be changed, with the loss probability "a" taken into consideration, to retrieve the amount of data sufficient for decoding even if packets are lost.

The ability of this distributed storage system to execute the recording and reproducing of data through calculation based on the recording probability and the return probability makes the data management simple and allows less powerful home apparatuses, such as a camcorder and a cellular phone, to be applied to this system. Because less powerful home apparatuses such as a camcorder and a cellular phone can be used as a node, a distributed storage system of several hundreds of apparatuses can be built easily.

Although the recording command apparatus transmits the recording data and the recording probability via the same packet in the distributed storage system described above, it is also possible to transmit the recording data and the recording probability via separate packets or to record them on an external recording apparatus to allow the information processing nodes to reference them.

In the embodiment described above, although the focus is on an example of the configuration in which packet transfer processing is performed by an information processing apparatus connected to a network, the present invention is not limited to the configuration with a packet transfer configuration. For example, even in a communication among wireless communication apparatuses or in an inter-device communication configuring the electronic circuits of an information processing apparatus such as a PC, the data corresponding to the description of processing rule deciding condition described above, if set for the transfer data, allows a wireless communication apparatus or a device that receives processing request data to autonomously determine whether to execute the requested processing.

[6. Hardware Configuration of Information Processing Apparatus]

Next, an example of the hardware configuration of an information processing apparatus configuring the node, the recording command apparatus, and the reproducing command apparatus described in the embodiment described above will be described.

Figure 20:
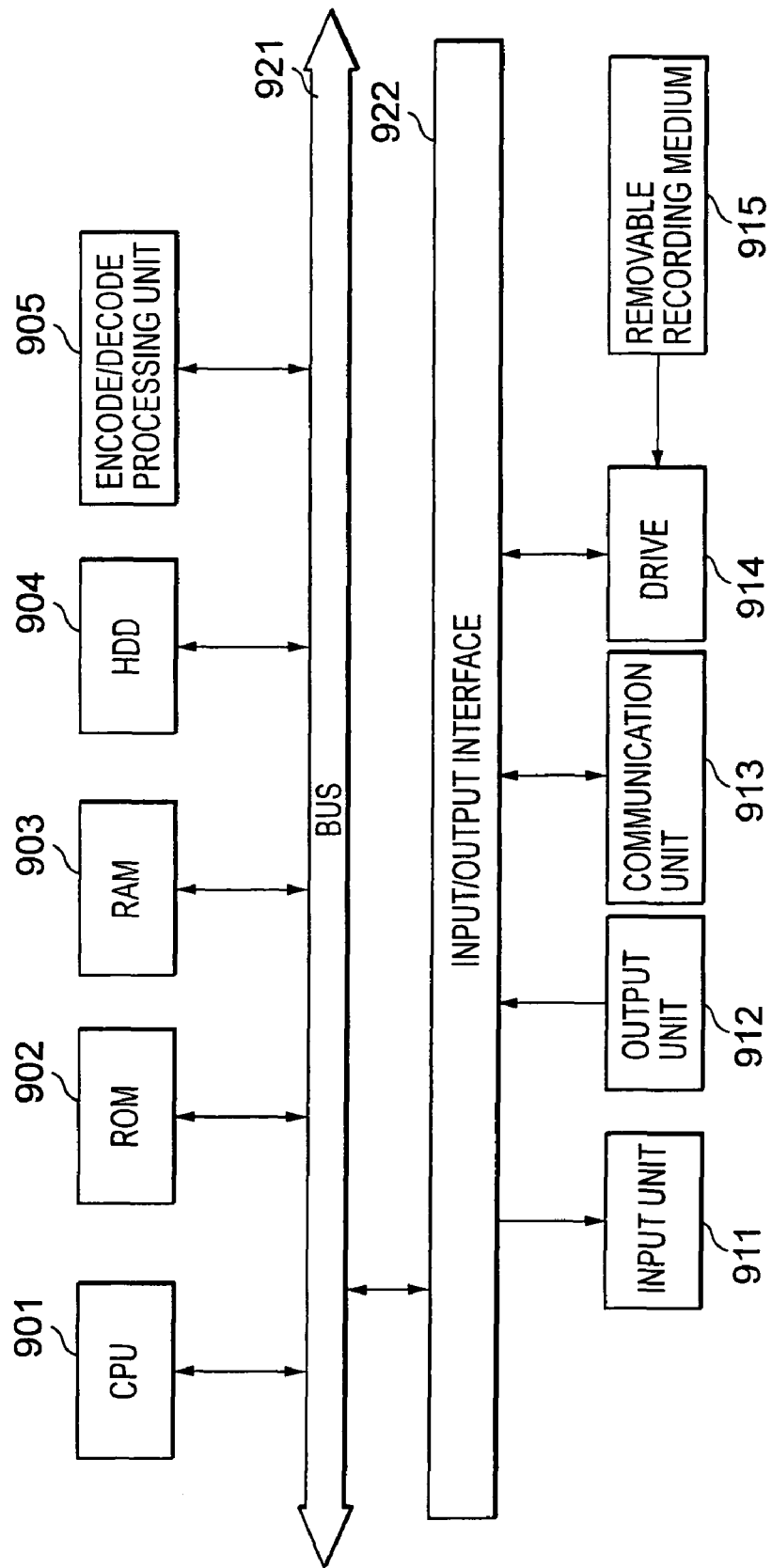
FIG. 20 is a diagram showing an example of the hardware configuration of the information processing apparatus according to the present invention.

FIG. 20 shows an example of an information processing apparatus with a CPU (Central Processing Unit) as control means. The following describes the configuration shown in FIG. 20. A CPU (Central Processing Unit) 901 is a processor that executes various programs. A ROM (Read Only Memory) ROM 902 stores programs executed by the CPU 901 or fixed data used as calculation parameters. A RAM (Random Access Memory) 903 is used as the storage area and the work area for the programs to be executed during processing of the CPU 901 or for the parameters that vary during program execution.

An HDD 904 executes the control of a hard disk and executes the storage processing and the reproducing processing of various types of data and programs for the hard disk. An encode/decode processing unit 905 executes encode processing for transmission data such as contents and decode processing for reception data according to the processing described above.

A bus 921, composed of a PCI (Peripheral Component Internet/Interface) bus and so on, enables data to be transferred to and from the input/output apparatuses via the modules and an input/output interface 922.

An input unit 911 is an input unit including, for example, a keyboard and a pointing device. A command is input into the CPU 901 when the input unit 911 is operated via the keyboard or the mouse or when data is received from a communication unit 913, and the programs stored in the ROM (Read Only Memory) 902 are executed. An output unit 912, for example, a CRT or a liquid crystal display, displays various types of information in text or images.

The communication unit 913, which executes communication among information processing apparatuses or communication processing with other entities, transmits data supplied from the storage units or data processed by the CPU 901 and the encode/decode processing unit 905, and receives data from other entities, under control of the CPU 901.

A drive 914, which is a drive executing the recording and reproducing of a removable recording medium 915 such as a flexible disk, a CD-ROM (Compact-Disc Read Only Memory), an MO (Magneto optical) disc, a DVD (Digital Versatile Disc), a magnetic disk, and a semiconductor memory, reproduces programs and data from the removable recording medium 915 and store program and data to the removable recording medium 915.

When a program or data is reproduced from a storage medium for execution or processing on the CPU 901, the program or the data that is reproduced is supplied, for example, to the connected RAM 903 via the input/output interface 922 or the bus 921.

The processing described in the specification can be executed via software or hardware or in the composite configuration of the both. To execute a sequence of processing via software, a computer in which the programs of the software are built in the special hardware may be provided, a program-readable recording medium such as a flexible disk or a CD-ROM, in which the programs are stored, may be supplied to a computer, such as a PC, in which the programs can be installed for executing various functions, or the programs may be downloaded via a communication network such as the Internet.

More specifically, the programs can be recorded in advance in the hard disk or the ROM (Read Only Memory) used as the recording medium. Alternatively, the programs can be temporarily or permanently stored (recorded) on a removable recording medium such as a flexible disk, a CD-ROM (Compact Disc Read Only Memory), an MO (Magneto optical) disc, a DVD (Digital Versatile Disc), a magnetic disk, or a semiconductor memory. This removable recording medium can be provided as packaged software.

The programs are installed from one of removable recording media described above to the computer, transferred wirelessly from a download site to the computer, or transferred to the computer via cable over a network such as a LAN (Local Area Network) and the Internet. The computer receives the programs transferred in such a way, and the programs can be installed on a recording medium such as a built-in hard disk.

A camcorder, a personal video recorder, and a home gateway are possible information processing apparatuses for configuring a node, a recording command apparatus, and a reproducing command apparatus. Another apparatus with a configuration having a recording unit for recording data, a control unit for performing a predetermined calculation, and a network interface for transmitting and receiving data may also be used.

Although the recording probability: α and the return probability: β are recorded in a packet, the recording probability: α and the return probability: β may also be recorded in any recording unit or a packet to allow the nodes to reference the values. When the reed tornado encoding method is used for FEC encoding, the interleave processing may be omitted.

The various processing described in the specification can be executed not only in a time series manner according to the description but also concurrently or individually according to the processing capability of the apparatus that executes the processing or according to the requirement. In this specification, the system refers to the configuration of a logical collection of multiple apparatuses but is not limited to the configuration in which the apparatuses, each with its own configuration, are in the same cabinet.

The present invention has been described in detail with reference to specific embodiments. However, it is apparent that those skilled in the art can make modifications or substitutions of the embodiments without departing from the spirit of the present invention. That is, the present invention that has been disclosed is illustrative and not restrictive. To understand the spirit of the present invention, the claims described in the first part should be referenced.

INDUSTRIAL APPLICABILITY

As described above, when data recording processing is performed for a plurality of distributed nodes connected to a network, a recording command apparatus sets data for determining for the nodes to determine whether to execute data recording and transmits a data recording processing request, in which the data for determination and data to be recorded are stored, to the nodes so that the nodes can autonomously determine whether to execute data recording processing based on the data for determination. Therefore, the configuration of the present invention eliminates the need for the recording command apparatus, which issues a recording request, to perform preprocessing such as the selection of a particular recording node, thus increasing the efficiency of data recording processing for distributed nodes.

Furthermore, when data recorded in the distributed nodes connected to a network is collected and reproduced, a reproducing command apparatus that transmits a data reproducing processing request sets data for determining for the nodes to determine whether to extract and transmit data and transmits a data reproducing processing request, in which the data for determination that is set and data specifying data to be reproduced are stored, to the nodes so that the nodes can autonomously determine whether to extract and transmit data based on the data for determination. Therefore, the configuration according to the present invention eliminates the need for the reproducing command apparatus to perform preprocessing such as the selection of a particular recording node, thus increasing the efficiency of data reproducing processing for distributed nodes.

Furthermore, the configuration according to the present invention eliminates the need for the processing requesting side to search for a node (information processing apparatus) to be processed, because an information processing apparatus connected to the network determines whether to execute processing requested by the processing request based on the data for determination included in the data processing request received via the data reception unit.

Furthermore, the configuration according to the present invention ensures the reliable recovery of data from the return data, because data distributed and recorded to the nodes is divided into p blocks, FEC encoding with the encoding rate of q/p is performed for the p blocks to convert them into q blocks, and the recording probability: $\alpha$ of each node and the return probability: $\beta$ specified by the reproducing command apparatus are set such that the number of return blocks: $q \times \alpha \times n \times \beta$ > the number of blocks: p.

The invention claimed is:

1. An information processing apparatus comprising:
a data reception unit;
a rule decision processing unit configured to determine whether data processing based on a data processing request received via the data reception unit is to be executed; and
a data processing unit configured to execute data processing based on the determination of the rule decision processing unit, wherein
the rule decision processing unit is configured to execute determination processing for determining whether or not the processing according to the processing request is to be executed based on a rule deciding condition descriptor, and the rule deciding condition descriptor is determined based on a probability value.

2. The information processing apparatus according to claim 1, wherein:
said rule deciding condition descriptor is included in a data processing request; and
said rule decision processing unit is configured to generate a random number and to execute determining processing for determining whether or not the processing according to a processing request is to be executed based on a comparison between the generated random number and said rule deciding condition descriptor.

3. The information processing apparatus according to claim 1, wherein:
said rule deciding condition descriptor is included in a data processing request; and
said rule decision processing unit is configured to perform hash value calculation processing based on the data processing request storing data, and to execute determining processing for determining whether or not the processing according to a processing request is to be executed based on a comparison between a calculated hash value and a setting value set in its own apparatus in advance.

4. A data processing method for analyzing a data processing request received via a data reception unit, and for determining whether the data processing request is to be executed, comprising:
a rule decision processing step for determining whether data processing based on the data processing request is to be executed; and
a data processing step for executing data processing based on the determination of the rule decision processing step, wherein
the rule decision processing step determines whether or not the processing according to the processing request is to be executed based on a rule deciding condition descriptor, and the rule deciding condition descriptor is determined based on a probability value.

5. The data processing method according to claim 4, wherein:
said rule deciding condition descriptor is included in the data processing request; and
said rule decision processing step generates a random number and determines whether or not the processing according to the processing request is to be executed based on a comparison between the generated random number and the said rule deciding condition descriptor.

6. The data processing method according to claim 4, wherein:

said rule deciding condition descriptor is included in the data processing request; and said rule decision processing step executes hash value calculation processing based on the data processing request storing data, and determines whether or not processing according to the processing request is to be executed based on a comparison between a calculated hash value and a setting value set in its own apparatus in advance.

7. A computer-readable storage medium including a computer program for analyzing a data processing request received via a data reception unit, and for determining whether the data processing request is to be executed, wherein, the computer program, when executed by a processor, causes the process to perform a method comprising:

a rule decision processing step for determining whether the data processing based on the data processing request is to be executed; and a data processing step for executing the data processing based on the determination of the rule decision processing step, wherein the rule decision processing step determines whether or not the processing according to the processing request is to be executed based on a rule deciding condition descriptor, and the rule deciding condition descriptor is determined based on a probability value.

* * * * *